(12) United States Patent
Goyal et al.

(10) Patent No.: US 12,094,190 B2
(45) Date of Patent: Sep. 17, 2024

(54) SYSTEMS, METHODS, AND APPARATUSES FOR IMPLEMENTING MEDICAL IMAGE SEGMENTATION USING INTERACTIVE REFINEMENT

(71) Applicant: Arizona Board of Regents on behalf of Arizona State University, Scottsdale, AZ (US)

(72) Inventors: Diksha Goyal, Tempe, AZ (US); Jianming Liang, Scottsdale, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 280 days.

(21) Appl. No.: 17/675,929

(22) Filed: Feb. 18, 2022

(65) Prior Publication Data

US 2022/0270357 A1    Aug. 25, 2022

Related U.S. Application Data

(60) Provisional application No. 63/151,558, filed on Feb. 19, 2021.

(51) Int. Cl.
*G06V 10/778* (2022.01)
*G06T 7/00* (2017.01)
(Continued)

(52) U.S. Cl.
CPC ........ *G06V 10/7788* (2022.01); *G06T 7/0012* (2013.01); *G06T 7/11* (2017.01);
(Continued)

(58) Field of Classification Search
CPC ........... G06V 10/7788; G06V 10/7747; G06V 10/82; G06V 10/755; G06V 10/26;
(Continued)

(56) References Cited

U.S. PATENT DOCUMENTS 10,366,490 B2    7/2019  Xu et al.
11,562,490 B2 *  1/2023  Homayounfar ........ G06N 3/044
(Continued)

OTHER PUBLICATIONS

Minaee, "Image Segmentation Using Deep Learning: A Survey", Nov. 15, 2020 (Year: 2020).*
(Continued)

*Primary Examiner* — Juan A Torres
(74) *Attorney, Agent, or Firm* — Elliott, Ostrander & Preston, P.C.

(57) ABSTRACT

Medical image segmentation using interactive refinement, in which the trained deep models are then utilized for the processing of medical imaging are described. Operating a two-step deep learning training framework including receiving original input images at the deep learning training framework; generating an initial prediction image specifying image segmentation by base segmentation model; receiving user input guidance signals; routing each of (i) the original input images, (ii) the initial prediction image, and (iii) the user input guidance signals to an InterCNN; generating a refined prediction image specifying refined image segmentation by processing each of the (i) the original input images, (ii) the initial prediction image, and (iii) the user input guidance signals through the InterCNN to render the refined prediction image incorporating the user input guidance signals; and outputting a refined segmentation mask to the deep learning training framework as a guidance signal.

20 Claims, 23 Drawing Sheets

(51) Int. Cl.
G06T 7/11 (2017.01)
G06T 7/194 (2017.01)
G06V 10/774 (2022.01)
G06V 10/82 (2022.01)

(52) U.S. Cl.
CPC .......... *G06T 7/194* (2017.01); *G06V 10/7747* (2022.01); *G06V 10/82* (2022.01); *G06T 2200/24* (2013.01); *G06T 2207/20081* (2013.01); *G06T 2207/20084* (2013.01); *G06T 2207/20092* (2013.01); *G06T 2207/30004* (2013.01)

(58) Field of Classification Search
CPC ..... G06V 10/7454; G06T 7/0012; G06T 7/11; G06T 7/194; G06T 2200/24; G06T 2207/20081; G06T 2207/20084; G06T 2207/20092; G06T 2207/30004
USPC ......................................................... 382/128
See application file for complete search history.

(56) References Cited

U.S. PATENT DOCUMENTS

| | | | |
|---|---|---|---|
| 2019/0311478 A1 | 10/2019 | Avendi et al. | |
| 2020/0167930 A1* | 5/2020 | Wang | G06N 3/08 |
| 2021/0174497 A1* | 6/2021 | Yoo | G06F 18/213 |
| 2022/0138483 A1* | 5/2022 | Zhang | G06V 20/63 |
| | | | 382/176 |

OTHER PUBLICATIONS

Acuna, D. et al., "Efficient interactive annotation of segmentation datasets with polygon-rnn++," Proceedings of the IEEE conference on Computer Vision and Pattern Recognition, 2018, pp. 859-868.
Bloch, N., et al., NCI-ISBI 2013 Challenge: Automated Segmentation of Prostate Structures, The Cancer Imaging Archive, 2015. http://doi.org/10.7937/K9/TCIA.2015.zFOVIOPv.
Bredell, G. et al., "Iterative interaction training for segmentation editing networks," Machine Learning in Medical Imaging: 9th International Workshop, MLMI 2018, Held in Conjunction with MICCAI 2018, Granada, Spain, Sep. 16, 2018, Proceedings 9, pp. 363-370, Springer International Publishing.
Bresson, X. et al., Fast global minimization of the active contour/snake model. Journal of Mathematical Imaging and vision, 28(2), 2007, pp. 151-167.
Castrejon, L. et al., "Annotating object instances with a polygon-rnn," Proceedings of the IEEE conference on computer vision and pattern recognition, 2017, pp. 5230-5238.
Chan, T.F. et al., "Active contours without edges," IEEE Transactions on image processing, 10(2), 2001, pp. 266-277.
Chen, W. et al., "Prostate segmentation using 2D bridged U-net," 2019 International Joint Conference on Neural Networks (IJCNN), 2019, pp. 1-7, IEEE.
Chen, X. et al., "Learning active contour models for medical image segmentation," Proceedings of the IEEE/CVF conference on computer vision and pattern recognition, 2019, p. 11632-11640.
çiçek, Ö et al., "3D U-Net: learning dense volumetric segmentation from sparse annotation," Medical Image Computing and Computer-Assisted Intervention-MICCAI 2016: 19th International Conference, Athens, Greece, Oct. 17-21, 2016, Proceedings, Part II 19, 2016, pp. 424-432, Springer International Publishing.
Criminisi, A. et al., "Geos: Geodesic image segmentation," Computer Vision-ECCV 2008: 10th European Conference on Computer Vision, Marseille, France, Oct. 12-18, 2008, Proceedings, Part I 10, 2008, pp. 99-112, Springer Berlin Heidelberg.
Freedman, D. et al., "Interactive graph cut based segmentation with shape priors," 2005 IEEE Computer Society Conference on Computer Vision and Pattern Recognition (CVPR'05). Vol. 1, 2005, pp. 755-765, IEEE.
Goyal, D. "Medical Image Segmentation Using Interactive Refinement," Arizona State University ProQuest Dissertations Publishing, 2021, 40 pages.
Hatamizadeh, A. et al., "Deep active lesion segmentation," Machine Learning in Medical Imaging: 10th International Workshop, MLMI 2019, Held in Conjunction with MICCAI 2019, Shenzhen, China, Oct. 13, 2019, Proceedings 10, 2019, pp. 98-105, Springer International Publishing.
Hatamizadeh, A. et al., "End-to-end deep convolutional active contours for image segmentation," arXiv preprint arXiv: 1909.13359, 2019.
He, K. et al., "Deep residual learning for image recognition," Proceedings of the IEEE conference on computer vision and pattern recognition, 2016, pp. 770-778.
Imran, A. A. Z. et al., "Automatic segmentation of pulmonary lobes using a progressive dense V-network, "International Workshop on Deep Learning in Medical Image Analysis, 2018, pp. 282-290, Springer International Publishing.
Isensee, F. et al., "nnu-net: Self-adapting framework for u-net-based medical image segmentation," arXiv preprint arXiv:1809.10486, 2018.
Jang W.D. et al., "Interactive image segmentation via backpropagating refinement scheme," Proceedings of the IEEE/CVF Conference on Computer Vision and Pattern Recognition, 2019, pp. 5297-5306.
Kass, M. et al., "Snakes: Active contour models," International journal of computer vision, 1(4), 1988, pp. 321-331.
Krizhevsky, A. et al., "Imagenet classification with deep convolutional neural networks," Advances in neural information processing systems, 25, 2012, pp. 1097-1105.
Li, X. et al., "H-DenseUNet: hybrid densely connected UNet for liver and tumor segmentation from CT volumes," IEEE transactions on medical imaging, 37(12), 2018, pp. 2663-2674.
Ling, H. et al., "Fast interactive object annotation with curve-gon," Proceedings of the IEEE/CVF Conference on Computer Vision and Pattern Recognition, 2019, pp. 5257-5266.
Marcos, D. et al., "Learning deep structured active contours end-to-end," Proceedings of the IEEE conference on computer vision and pattern recognition, 2018, pp. 8877-8885.
Medical Segmentation Decathlon. Medical segmentation decathlon, 2018. http://medicaldecathlon.com/, Last accessed on 2019, obtained on May 29, 2024.
Milletari, F. et al., "V-net: Fully convolutional neural networks for volumetric medical image segmentation,". In 2016 fourth international conference on 3D vision (3DV), 2016, pp. 565-571, Ieee.
Nie, D. et al., "ASDNet: Attention based semi-supervised deep networks for medical image segmentation," Medical Image Computing and Computer Assisted Intervention-MICCAI 2018: 21st International Conference, Granada, Spain, Sep. 16-20, 2018, Proceedings, Part IV 11, 2018, pp. 370-378, Springer International Publishing.
Oktay, O. et al., "Attention u-net: Learning where to look for the pancreas," arXiv preprint arXiv: 1804.03999, 2018.
Ronneberger, O. et al., "U-net: Convolutional networks for biomedical image segmentation," Medical image computing and computer-assisted intervention-MICCAI 2015: 18th international conference, Munich, Germany, Oct. 5-9, 2015, proceedings, part III 18, 2018, pp. 234-241, Springer International Publishing.
Rother, C. et al., "Grabcut interactive foreground extraction using iterated graph cuts," ACM transactions on graphics (TOG), 23(3), 2004, pp. 309-314.
Sakinis, T. et al., "Interactive segmentation of medical images through fully convolutional neural networks," arXiv preprint arXiv: 1903.08205, 2019.
Schlemper, J., et al., "Attention gated networks: Learning to leverage salient regions in medical images," Medical image analysis, 53, 2018, pp. 197-207.
Simonyan, K. et al., "Very deep convolutional networks for large-scale image recognition," arXiv preprint arXiv: 1409.1556, 2014.
Szegedy, C. et al., "Going deeper with convolutions," Proceedings of the IEEE conference on computer vision and pattern recognition, 2015, pp. 1-9.

(56) References Cited

OTHER PUBLICATIONS

Wang, G. et al., "Deepigeos: a deep interactive geodesic framework for medical image segmentation," IEEE transactions on pattern analysis and machine intelligence, 41(7) 2018, pp. 1559-1572.

Wang, G. et al., "Interactive medical image segmentation using deep learning with image-specific fine tuning," IEEE transactions on medical imaging 37.7, 2018, pp. 1562-1573.

Wang, N. et al., "Pixel2mesh: Generating 3d mesh models from single rgb images," Proceedings of the European Conference on Computer Vision (ECCV), 2018, pp. 52-67.

Yezzi, A. et al., "A geometric snake model for segmentation of medical imagery," IEEE Transactions on medical imaging, 16(2), 1997, pp. 199-209.

Zhou, Z. et al., "Unet++: A nested u-net architecture for medical image segmentation," Deep Learning in Medical Image Analysis and Multimodal Learning for Clinical Decision Support: 4th International Workshop, DLMIA 2018, and 8th International Workshop, ML-CDS 2018, Held in Conjunction with MICCAI 2018, Granada, Spain, Sep. 20, 2018, Proceedings 4, 2018, pp. 3-11, Springer International Publishing.

\* cited by examiner

Table 1 - 405

| Dataset | Modalities | Total Classes | No. of Samples |
|---|---|---|---|
| Prostate (NCI-ISBI) | MRI(T2) | 2 | 29 |
| Heart | MRI | 1 | 20 |
| Spleen | CT | 1 | 41 |
| Pancreas | CT | 2 | 282 |
| Hippocampus | MRI | 2 | 260 |

FIG. 4A

Table 2 - 699

| Dataset | Scribble | 0 | 1 | 2 | 3 | 4 |
|---|---|---|---|---|---|---|
| Prostate | Region (5x5) | 0.8598 | 0.8896 | 0.9095 | 0.9256 | 0.9373 |
| Prostate | Centroid (5x5) | 0.8598 | 0.9264 | 0.9512 | 0.9624 | 0.9672 |
| Prostate | Curve | 0.8598 | 0.9611 | 0.9824 | 0.9874 | 0.9899 |
| Heart | Region (5x5) | 0.8889 | 0.9039 | 0.9168 | 0.9250 | 0.9340 |
| Heart | Curve | 0.8889 | 0.9385 | 0.9606 | 0.9728 | 0.9797 |
| Spleen | Region (5x5) | 0.9673 | 0.9763 | 0.9801 | 0.9830 | 0.9849 |
| Spleen | Curve | 0.9673 | 0.9907 | 0.9940 | 0.9950 | 0.9958 |
| Pancreas | Curve | 0.7706 | 0.8743 | 0.9015 | 0.9130 | 0.9189 |
| Pancreas Cancer | Curve | 0.8170 | 0.9027 | 0.9432 | 0.9512 | 0.9551 |
| Anterior Hippocampus | Curve | 0.8957 | 0.9413 | 0.9553 | 0.9630 | 0.9692 |
| Posterior Hippocampus | Curve | 0.8473 | 0.9134 | 0.9357 | 0.9492 | 0.9579 |

FIG. 6C

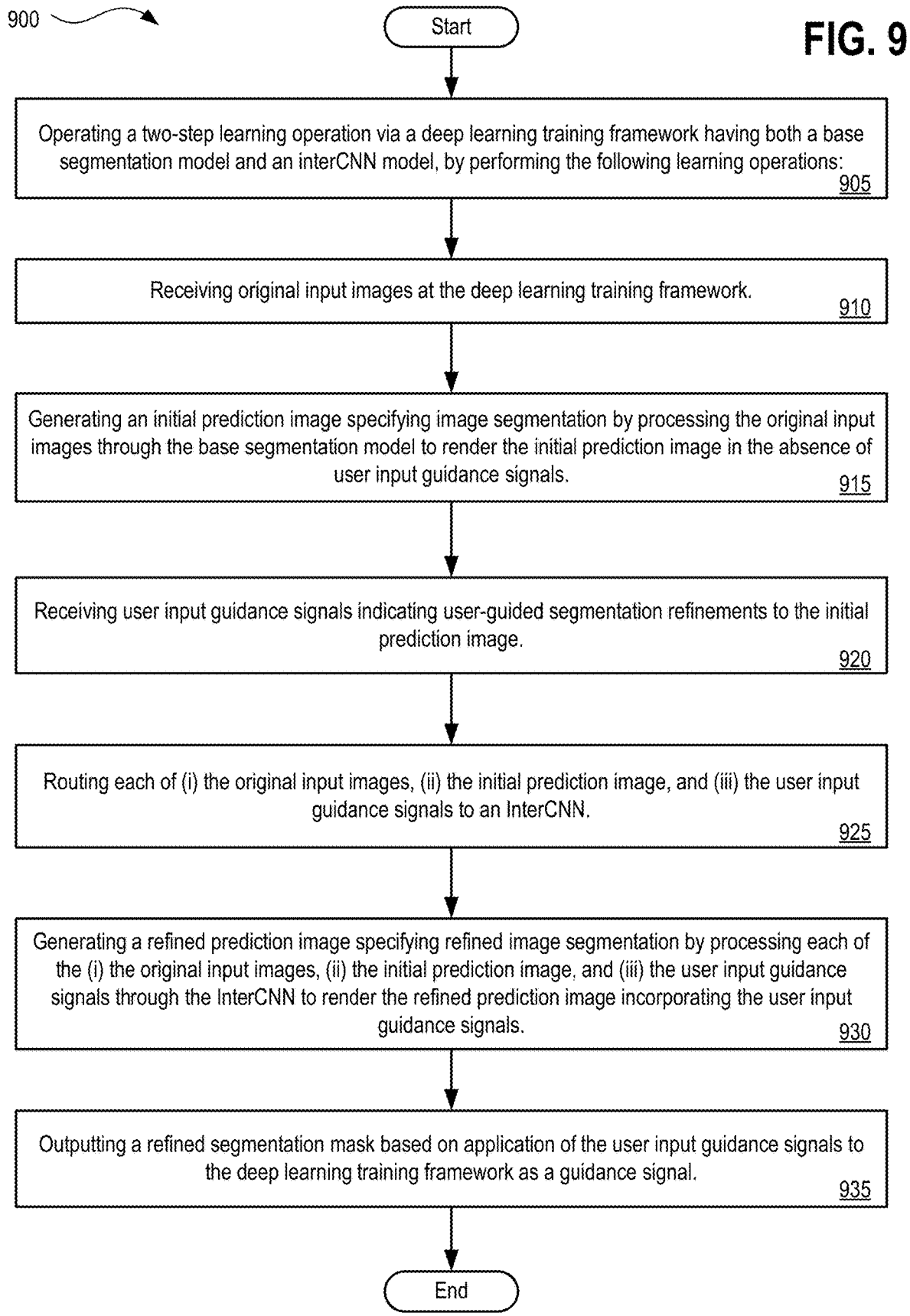

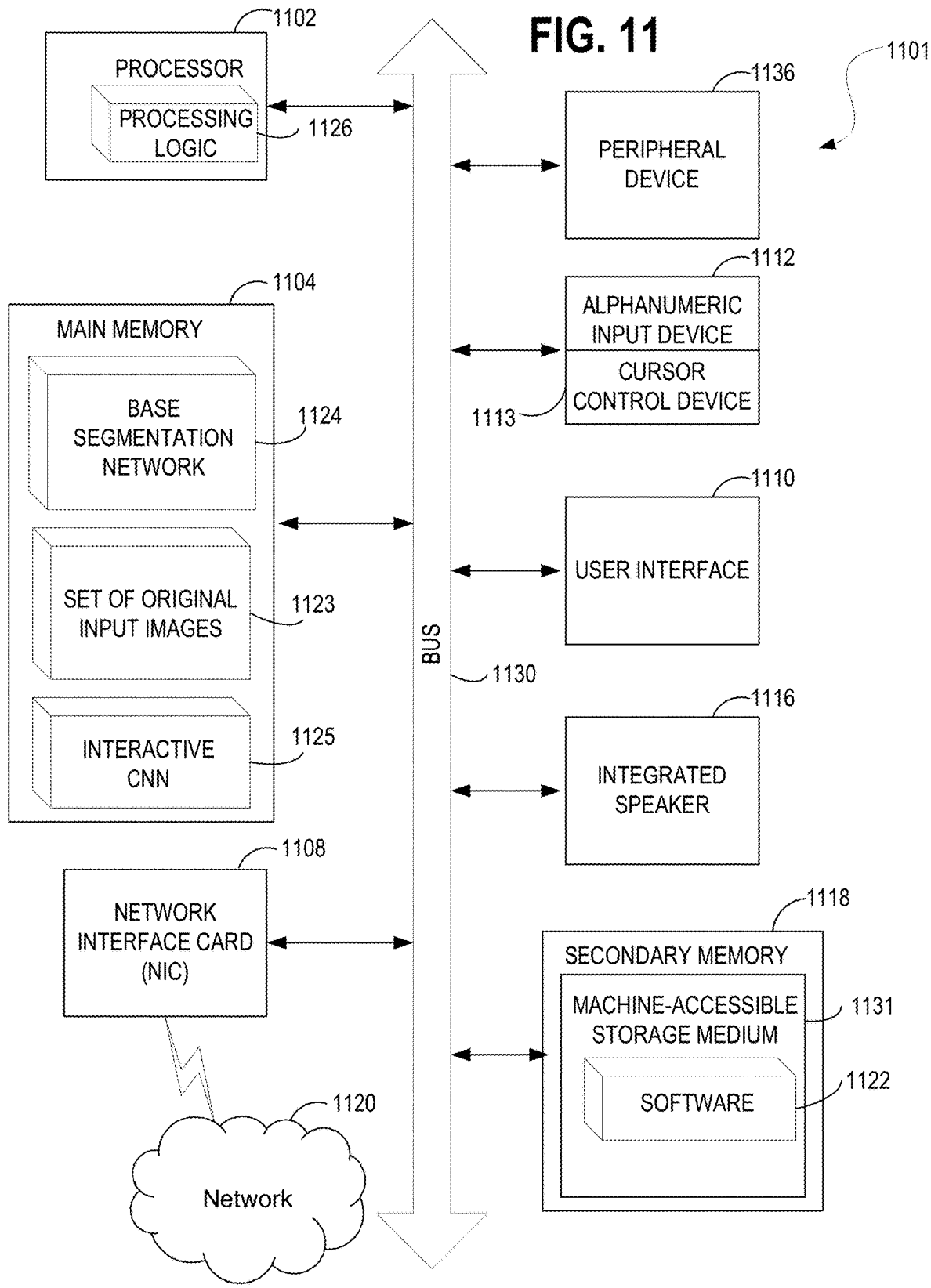

SYSTEMS, METHODS, AND APPARATUSES FOR IMPLEMENTING MEDICAL IMAGE SEGMENTATION USING INTERACTIVE REFINEMENT

CLAIM OF PRIORITY

This non-provisional U.S. Utility patent application is related to, and claims priority to the U.S. Provisional Patent Application No. 63/151,558, entitled "SYSTEMS, METHODS, AND APPARATUSES FOR IMPLEMENTING MEDICAL IMAGE SEGMENTATION USING INTERACTIVE REFINEMENT," filed Feb. 19, 2021, the entire contents of which are incorporated herein by reference.

GOVERNMENT RIGHTS AND GOVERNMENT AGENCY SUPPORT NOTICE

This invention was made with government support under 1548562 awarded by the National Science Foundation and R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and annotation of medical images, and more particularly, to systems, methods, and apparatuses for implementing medical image segmentation using interactive refinement, in which trained models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible.

The present state of the art may therefore benefit from the systems, methods, and apparatuses for implementing medical image segmentation using interactive refinement, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 4A presents Table 1 at element 405 which illustrates properties of different datasets from the MSD (Medical Segmentation Decathlon, 2018) and the NCI-ISBI 2013 datasets, in accordance with described embodiments;

FIG. 6C presents Table 2 at element 699 which illustrates the results of different proposed scribble types within the interaction network on five 3D segmentation tasks across organs, diseases, and modalities for interactions 0 to 4;

FIG. 9 depicts a flow diagram illustrating a method 900 for implementing medical image segmentation using interactive refinement, in accordance with described embodiments;

FIG. 11 illustrates a diagrammatic representation of a machine 1101 in the exemplary form of a computer system, in accordance with one embodiment.

DETAILED DESCRIPTION

Figure 1A:
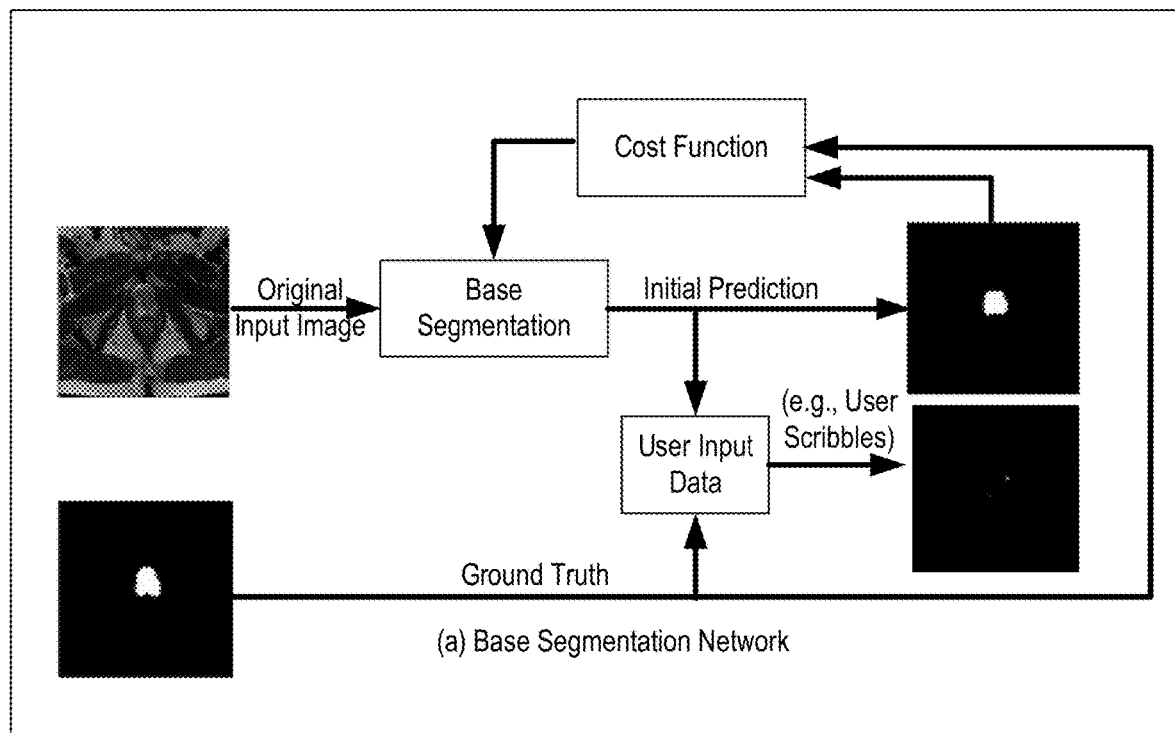
FIGS. 1A, 1B, and 1C depict (a) exemplary Base Segmentation Network (BSeg), (b) exemplary Interactive Segmentation Network (IntSeg), and (c) exemplary Interactive Network, according to described embodiments.

Described herein are systems, methods, and apparatuses for implementing medical image segmentation using interactive refinement, in which the trained deep models are subsequently utilized in the context of medical imaging.

Image segmentation is a critical problem in computer vision. Traditionally, manual segmentation requires outlining of object boundaries to get meaningful regions in an image. This is a very time consuming and laborious process which also requires expert domain knowledge. These manual annotations may be leveraged to train a supervised learning method to automate the process. Recently, the image segmentation performance has increased significantly through the utilization of a Convolutional Neural Network (CNN). However, this requires a large set of annotated training data which is difficult to obtain for medical images. To solve this problem, interactive segmentation techniques could be used to serve as a trade-off between fully automatic and manual approaches.

Described herein are novel techniques for implementing an interactive training strategy for segmentation, which is built on top of the "InterCNN" which is an interactive type of CNN, though other CNNs may be utilized. As described herein, a robot-user is utilized during training which mimics an actual annotator and provides corrections to the predicted masks by drawing scribbles. Using U-Net and nnU-Net as the initial segmentation models, segmentation performance is further improved by using the proposed interactive training scheme.

1. Introduction

Image segmentation consists of dividing an image into meaningful segments to distinguish different objects in an image. It plays an important role in medical imaging and computer aided diagnosis in order to separate various structures such as heart, spleen, knee, brain and blood vessel. This clinically useful information assist the radiologists in diagnosis, study of human anatomy, localization of pathology and treatment planning.

With the advent of deep learning, the performance of image segmentation algorithms has greatly increased. This success is attributed to the rise of networks with deeper architecture and the use of large annotated datasets. Collecting high-quality expert annotations demands an intensive and time-consuming labor, which is generally non-scalable and may not be manageable at intermediate to large scales. Thus, semi-automatic segmentation methods which integrate user input to guide segmentation, appears to be an efficient alternative to mitigate the annotation effort.

There have been many different methods being proposed for interactive segmentation. For instance, with prior techniques, an energy function is often minimized so that its local minimum is at the boundary of the object. More recent techniques have explored an interactive strategy by combining user interactions with CNNs. With such approaches, user inputs such as clicks, scribbles, points, extreme points, super-pixel annotations or bounding boxes are captured and then input as additional supervision to improve the results from automated approaches.

With regard to the disclosed methodologies, these heuristics are explored and leveraged to further benefit the resulting system output. Such methodologies additionally address the mechanisms by which to encode such heuristics so as to minimize the number of interactions that the user ultimately provides at test time.

A novel interactive training strategy is described in greater detail below which improves the segmentation accuracy. More particularly, the CNN is trained with user simulated inputs to edit the segmentation. Results on a prostate dataset from the NCI-ISBI 2013 challenge show superior performance with the curve based user-interaction in comparison to other user feedback. Moreover, using the recent state-of-the-art segmentation architecture nnU-Net as the base segmentation model, further performance improvement is observed using interactive training.

The unique challenges posed by medical image analysis have suggested that retaining a human end user in deep learning enabled segmentation system, will speed-up annotations and be able to refine existing methods.

Active Contour Models:

Prior solutions include Active Contour Models which proposed the use of the "snakes algorithm" to segment the images by means of energy minimization. In this approach, an initial contour is deformed along the boundary of an object in response to internal forces, external image forces and user defined constraints. These models are very sensitive to noise and the initial curve, which limits their practical applications. Other possible approaches include utilization of the Active Contour Without Edge (ACWE) technique, use of geodesic active contours, or the utilization of the Fast Global Minimization-based Active Contour Model (FGM-ACM).

Neural Networks for Semantic Segmentation:

With the introduction of deep learning algorithms, convolutional neural networks (CNNs) have significantly improved performance for segmentation tasks. Various classification architectures have been adapted to create semantic segmentation networks, as described below.

The most well known architecture U-Net uses the encoder-decoder architecture where the input image is down-sampled and then up-sampled to get image segmentation. The novel architecture of the U-Net has skip connections which are designed to forward feature maps from down-sampling path to up-sampling path to avoid losing high-resolution information.

Interactive Segmentation:

As discussed previously, neural networks have been used in an effective way for performing semantic segmentation. However, supervised training of such models require large amount of high quality labels. Acquiring such labeled data is tedious and often incurs high costs. Interactive segmentation allows human-computer interaction to obtain more accurate segmentation.

The DeepIGeoS methodology uses geodesic distance transforms of scribbles as an additional input to the CNN for interactive segmentation, in which point clicks that are modeled as Gaussian kernels are utilized as input for segmenting medical images. Alternatively, image-specific fine-tuning may be utilized which incorporates bounding box and scribble based segmentation.

The Polygon-RNN methodology predicts vertices of a polygon that are iteratively corrected. Several improvements to Polygon-RNN are implemented via Polygon-RNN++, in which a better learning algorithm is provided to train the model using reinforcement learning.

The Curve-GCN methodology represents an object as a graph and uses a Graph Convolutional Network (GCN) for predicting the locations of all vertices simultaneously. Consequently, with the use of Curve-GCN, there are N control points that are first initialized along a circle. These current coordinates are then concatenated with features extracted from the corresponding location and propagated via a GCN to predict a location shift for each node. When human-in-the-loop is available to the system, the annotator iteratively provides inputs which are then utilized to move wrong control points onto their correct locations.

Similarly, the Pixel2Mesh methodology also exploits a GCN to predict vertex locations of a 3D mesh.

Figure 1B:
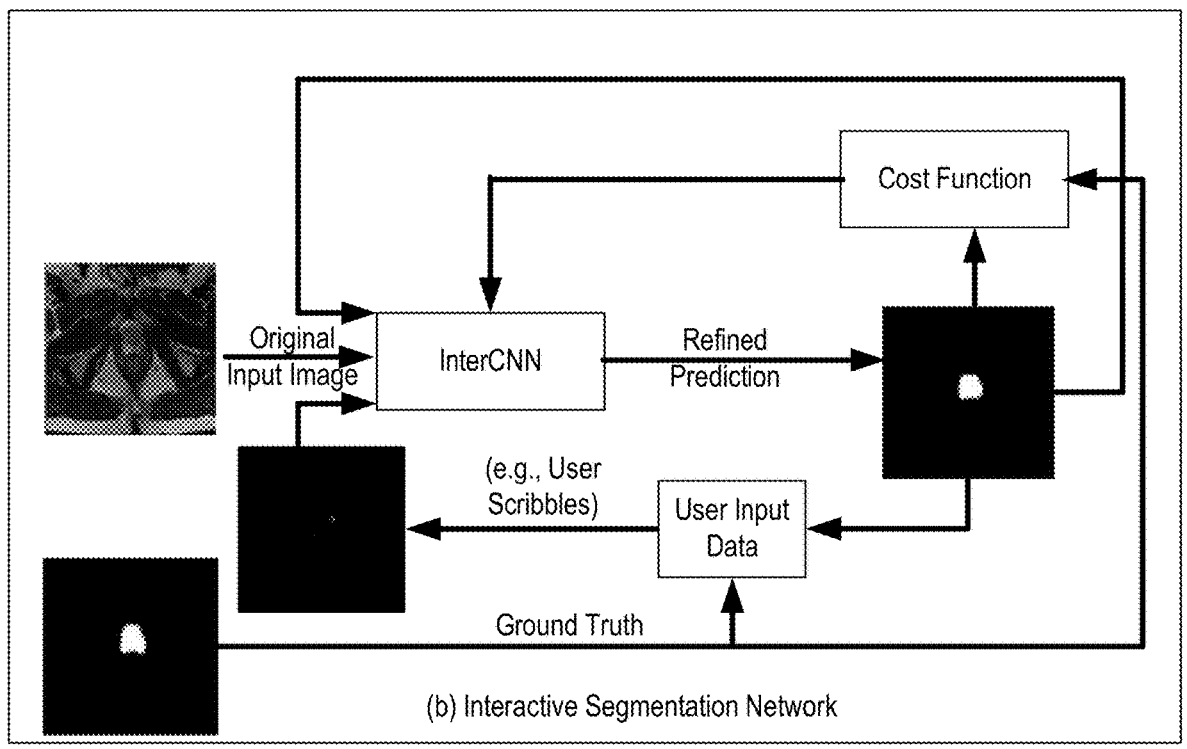
Figure 1C:
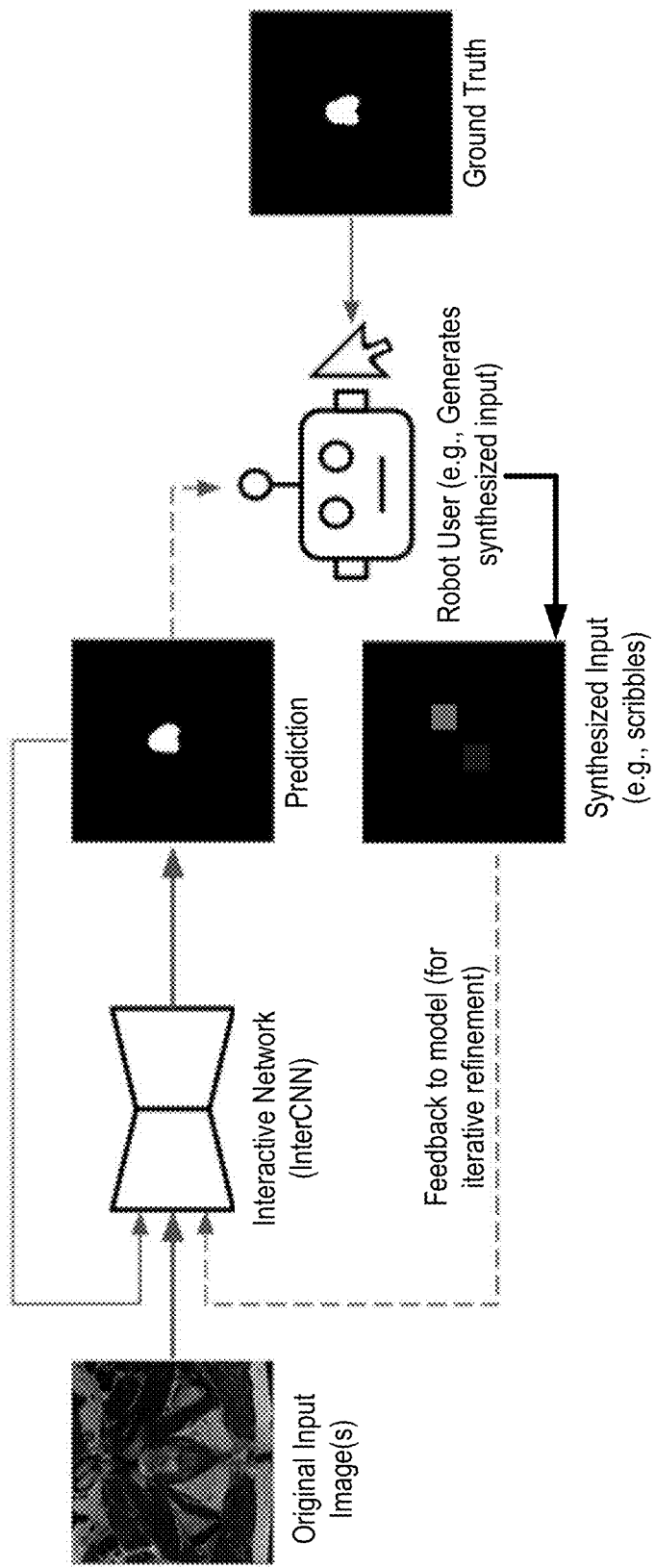

FIGS. 1A, 1B, and 1C depict (a) exemplary Base Segmentation Network (BSeg), (b) exemplary Interactive Segmentation Network (IntSeg), and (c) exemplary Interactive Network, according to described embodiments Novel Methodology:

Base Segmentation Network:

Described herein is the use of a U-Net based neural network architecture to predict an initial segmentation mask as is depicted at FIG. 1A (element 105). Further described is a trained 3D nn-UNet as it provides a robust and self-adapting framework with the ability to dynamically adapt to the details of the datasets (median patient size, input patch size, batch size, etc.) and amount of available GPU memory.

Interactive Segmentation Network:

Further described at FIG. 1B is the use of the architecture based on InterCNN, which allows for the network to have two additional inputs, user edits in the form of scribbles and most recent prediction.

User Interaction:

User guidance input is provided into the system by synthesizing or generating what appear to be captured user mouse events (e.g., clicks, click and drag, mouse over, mouse release, etc.), resulting in inputs which act as a guidance signal to the interaction network. Two types of user-emulated inputs are generated. Specifically, (i) "Foreground Clicks" $c_+$ are placed within the area of interest, i.e., object to guide the network towards predicting foreground, and (ii) "Background Clicks" $c_-$ are placed in the false positive areas which have been incorrectly segmented as foreground regions. These interactions are given to the interactive segmentation network (IntSeg) in the form of scribbles with the same spatial size as input images.

An alternative representation of an interactive network is provided at FIG. 1C, in which the exemplary Interactive Segmentation Network (IntSeg) is shown. Specifically, Foreground Click (lighter square) and Background Click (darker square) constitute the encoding for foreground and background correction to create scribbles. The scribbles and the previous prediction are concatenated with the input image to form a 3-channel input for the Interactive CNN. The network is trained iteratively using the simulated user edits to improve segmentation accuracy.

Figure 2:
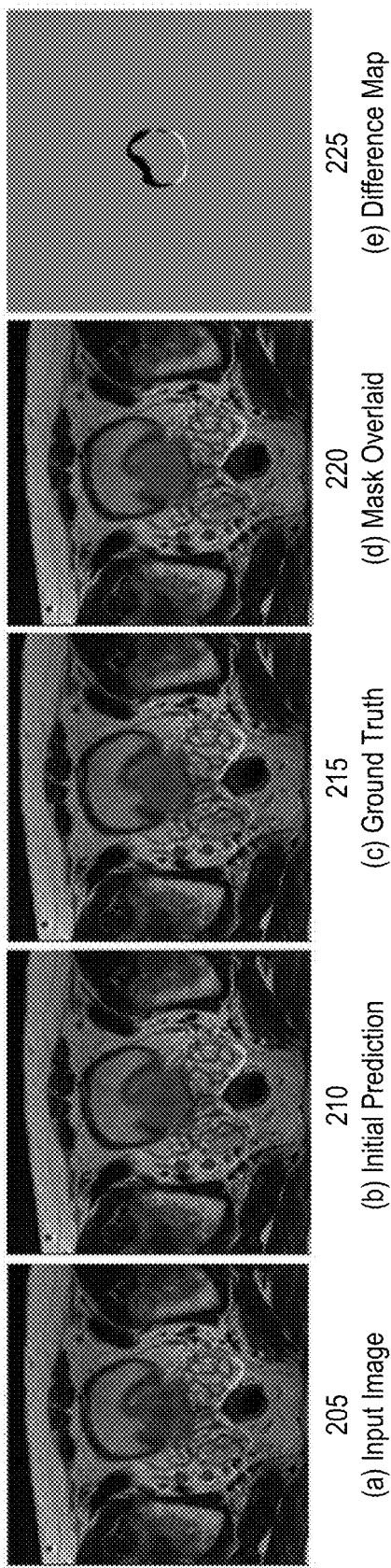
FIG. 2 provides examples showing (a) an input prostate image at element 205, (b) an initial prediction from base segmentation network at element 210, (c) a ground truth reference image at element 215 (d) ground truth and initial prediction references overlaid together at element 220 and lastly, (e) a difference map at element 225 to show clearly the false positive and false negative regions, according to described embodiments.

FIG. 2 provides examples showing (a) an input prostate image at element 205, (b) an initial prediction from base segmentation network at element 210, (c) a ground truth reference image at element 215 (d) ground truth and initial prediction references overlaid together at element 220 and lastly, (e) a difference map at element 225 to show clearly the false positive and false negative regions, according to described embodiments.

Training Strategy:

The initial predictions are received from a base segmentation network. These predictions are then compared with ground truth. The mislabeled pixels are identified and the scribble image is generated by the emulated user model. The input images along with the initial predictions and scribbles are fed to the IntSeg network. Subsequently, the IntSeg network updates the prediction and corresponding scribble, which are then fed to the model at the next interaction. This is done for k interactions.

The scribbles used during training should ideally be provided by users. However, this is not feasible for the sake of conducting a controlled experiment, and thus, user click inputs are emulated (e.g., simulated, synthesized, or generated) during the training phase.

Simulating Annotations:

First, mislabeled pixels are identified based on the prediction by comparing it with the ground truth mask. FIG. 2 at element 225 illustrates a difference map which shows incorrectly labeled pixels. The black and white region shows false positive $R_{fp}$ and false negative $R_{fn}$ regions respectively. Accordingly, these errors are corrected by providing user-inputs.

Figure 3:
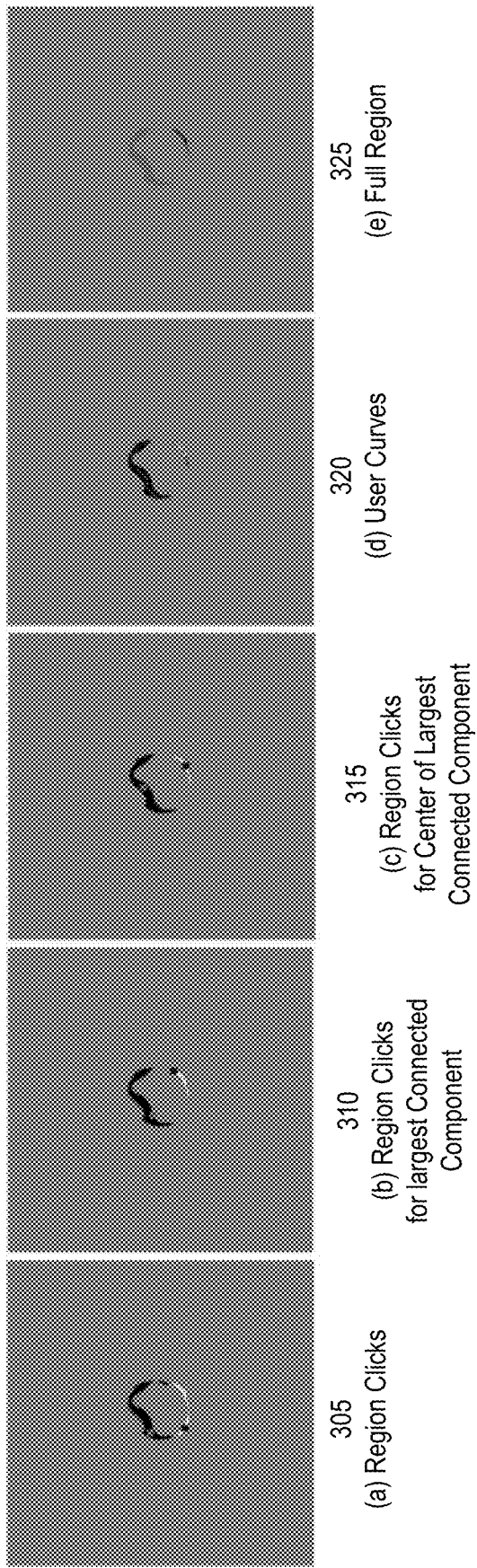
FIG. 3 depicts different types of annotation methods which utilize user input data capturing scribble/clicks used for foreground and background correction respectively, in accordance with described embodiments.

FIG. 3 depicts different types of annotation methods which utilize user input data capturing scribble/clicks used for foreground and background correction respectively, in accordance with described embodiments.

More particularly, each of the respective blocks depict varying types of annotation methodologies, as follows:

At element 305, region clicks are performed in which a 7×7 region or patch is placed randomly in the incorrectly predicted area for subsequent $R_{fp}$ and $R_{fn}$ correction in the manner described previously.

At element 310, region clicks are applied within the largest connected component. In particular, for both $R_{fp}$ and $R_{fn}$ regions, the largest incorrect cluster region is selected and the user emulated clicks are placed in that region.

At element 315, region clicks are applied at the center of the largest connected component. Consequently, the user annotators tend to correct the incorrect region by clicking at the center of the incorrect region. To replicate this behavior, the largest incorrect cluster region is selected and erosion is performed to get the center region of the cluster and a 7×7 region is placed at the center region of this cluster.

At element 320, user "curves" are applied by emulating or simulating user input data representing a user drawing curves. For instance, such curves may be emulated by utilizing image skeletonization. For the $R_fp$ and $R_fn$ regions, the largest incorrect cluster region is selected and is skeletonized to one (1) pixel width to match the user drawn curve.

At element 325, selection of the "Full Region" is depicted, in which the complete largest connected component is selected as scribble for $R_{fp}$ and $R_{fn}$ correction.

FIG. 4A presents Table 1 at element 405 which illustrates properties of different datasets from the MSD (Medical Segmentation Decathlon, 2018) and the NCI-ISBI 2013 datasets.

Figure 4B:
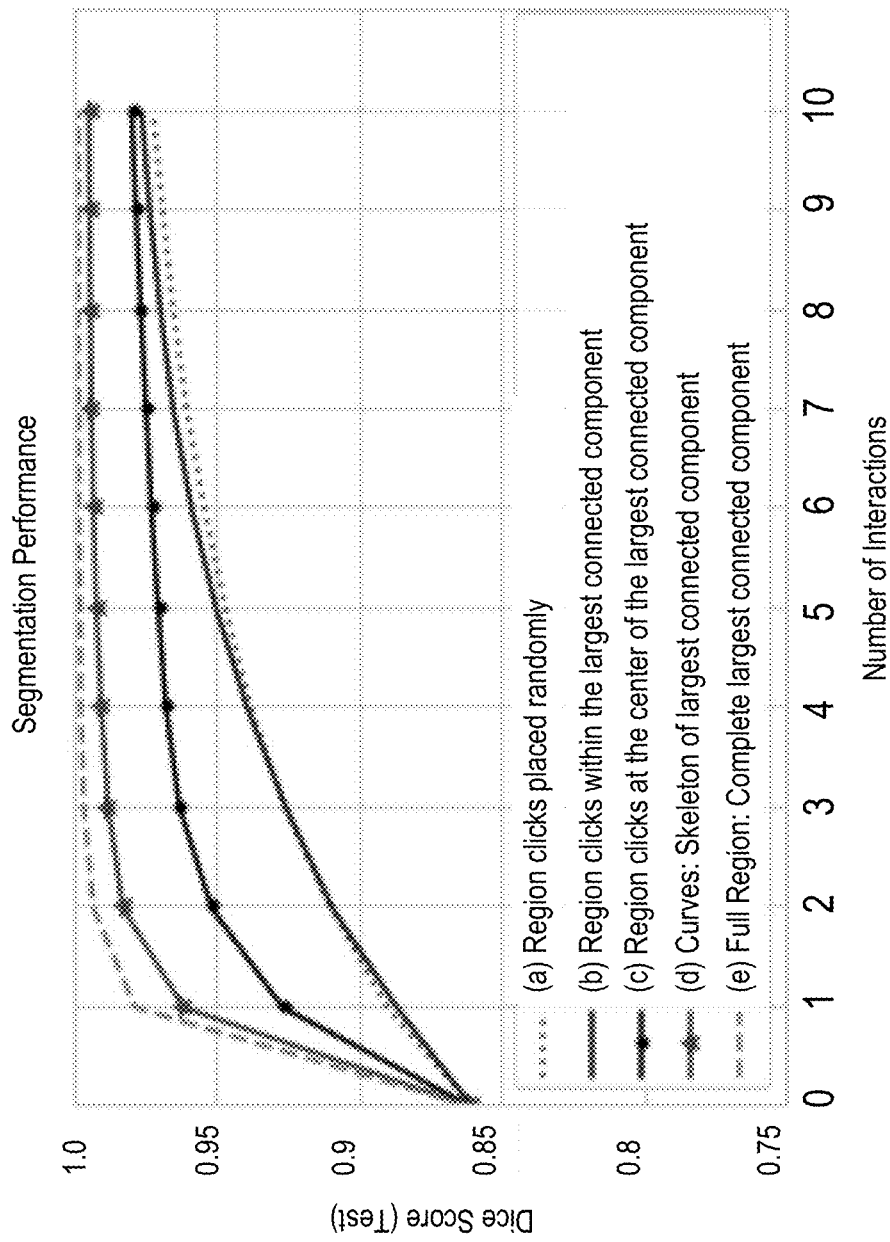
FIG. 4B depicts results on a Prostate dataset using different types of Annotation strategies, comparing the results with InterCNN by modifying the multi-class labels to binary by merging the central gland and peripheral zone, in accordance with described embodiments.

FIG. 4B depicts results on a Prostate dataset using different types of Annotation strategies, comparing the results with InterCNN by modifying the multi-class labels to binary by merging the central gland and peripheral zone, in accordance with described embodiments. Specifically shown is a comparison of different types of annotation strategy on prostate dataset, in which simple strokes (e.g., curves) behave better than the alternatives.

Evaluation:

Data: The method has been evaluated on Prostate (NCI-ISBI 2013 Challenge), Heart, Spleen, Pancreas and Hippocampus dataset (Medical Segmentation Decathlon challenge).

Implementation Details: The interactive segmentation network is trained for k number of interactions per batch. Hence, predictions from each batch are updated iteratively with the respective scribbles and fed into the network for k interactions. For the results shown here, the model was trained with the Adam optimizer for 80 epochs with learning rate 0.0001 followed by the application of data augmentation through the use of vertical or horizontal flipping, cropping and random rotation mechanisms. For pre-processing, all the images were normalized by mean value and standard variation of the training set.

For quantitative evaluation, the Dice score was measured as $$\frac{2 |R_g \cap R_p|}{|R_g| + |R_p|},$$

where $R_p$ and $R_g$ are the regions predicted by model and the ground truth. A robot user or simulated user is instantiated and executed to simulate user-annotations during testing up to 10 interactions. FIGS. 5A, 5B, 6A, and 6C each report the average segmentation accuracy (mean Dice score) across the first 10 iterated clicks on each dataset.

Different Annotation Methods: The type of scribble used for correction is important and can influence the performance. Therefore, performance across different scribble inputs were evaluated as shown in FIG. 3 on the Prostate dataset from NCI-ISBI 2013 challenge.

As is depicted at FIG. 4B, it was observed that the best performance is achieved when the largest incorrect cluster is considered a scribble. However, this may be impractical for annotators to mark the complete cluster. Using skeleton as a scribble is the next best method and can be a valid user interaction as a curve would have to be drawn in the middle of the largest error. Other simpler region based interactions have also been evaluated but all these approaches do not outperform the skeleton approach. Through these experiments, the effectiveness of good specification of user interaction to minimize the number of clicks and maintain high quality segmentation was thus demonstrated.

Figure 5A:
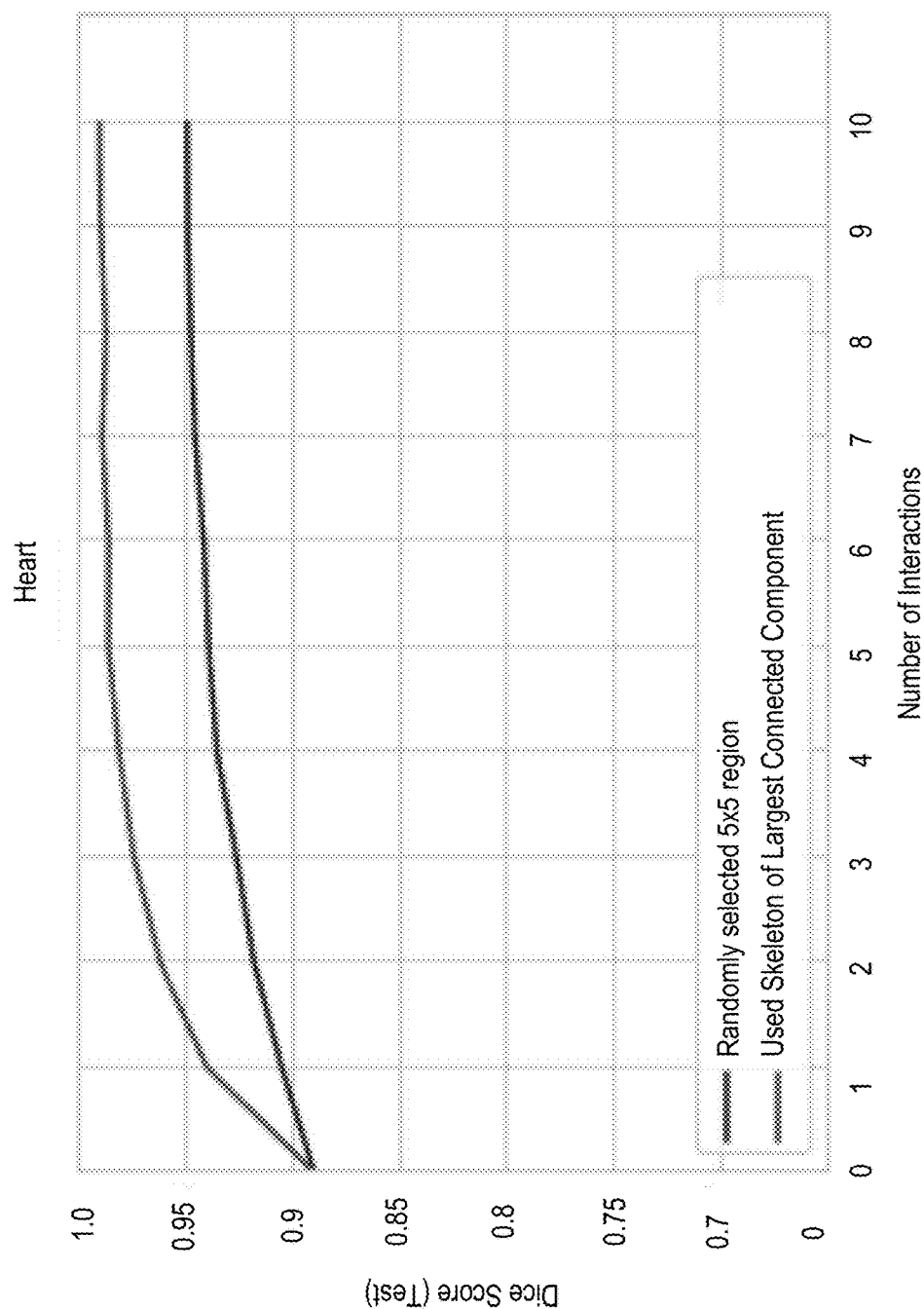
FIGS. 5A and 5B provide a comparison of Dice score using nnU-Net as the base segmentation model on Heart as set forth at FIG. 5A and Spleen dataset using region (5×5) and skeleton scribble as set forth at FIG. 5B, in accordance with described embodiments.
Figure 5B:
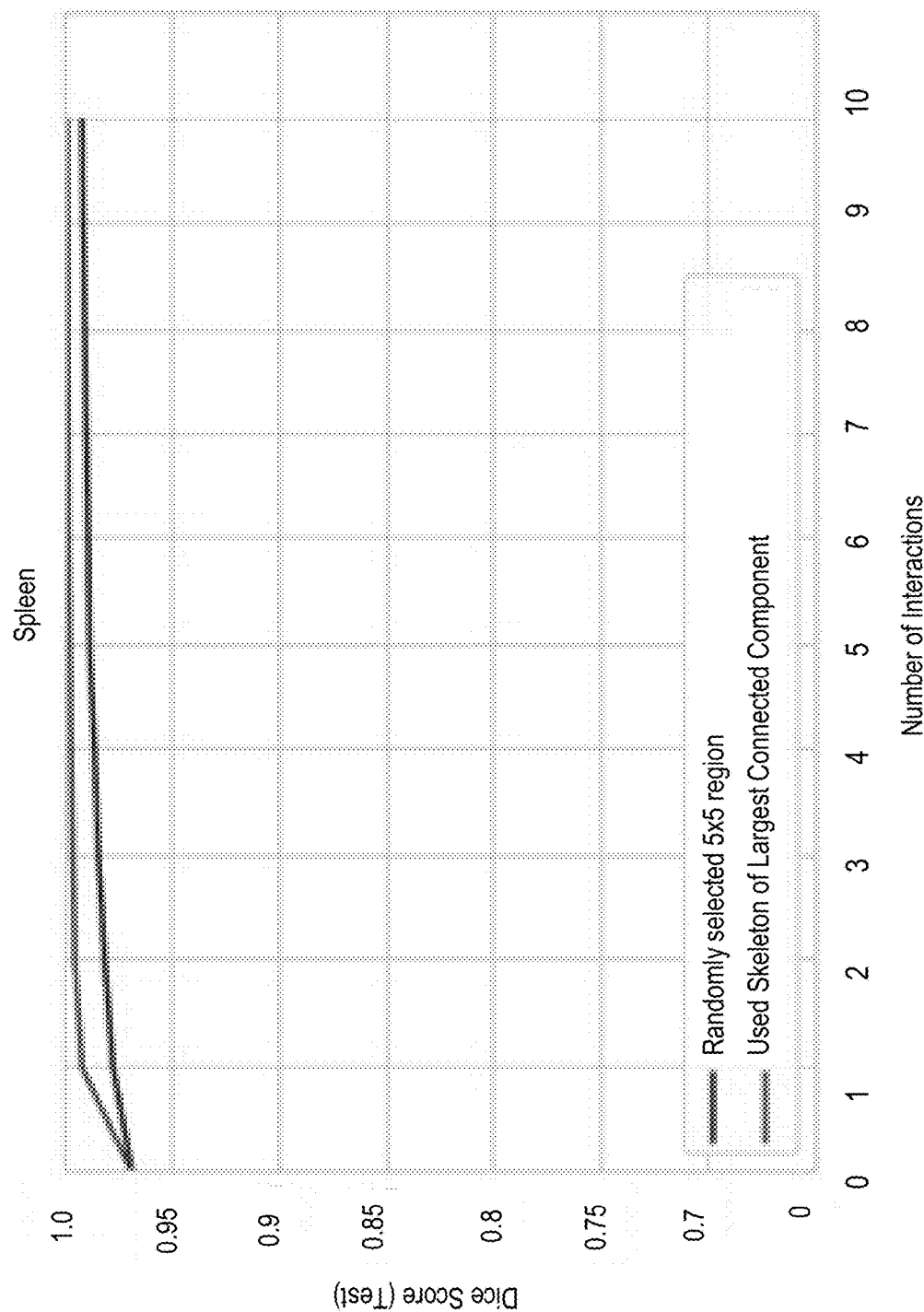

Base Segmentation Results:

Once the base segmentation model (BSeg) is trained, it is evaluated on the samples reserved for testing purposes. FIGS. 5A and 5B that follow show the initial segmentation performance at interaction 0 using nnU-Net as the base segmentation model. However, as is depicted at FIG. 4B, the prostate dataset using a U-Net architecture represents how performance improves with iterative cycling through the described methodology, specifically by using an initial prediction and then multiple cycles of utilizing the user input guidance signals provided to the interactive network.

FIGS. 5A and 5B provide a comparison of Dice score using nnU-Net as the base segmentation model on Heart as set forth at FIG. 5A and Spleen dataset using region (5×5) and skeleton scribble as set forth at FIG. 5B, according to described embodiments.

Comparison with state-of-the-art: Various experiments have also been done using nnU-Net as the base segmentation model. The predictions from this model are used as an input to the IntSeg.

Consider the results depicted at FIGS. 5A and 5B, which shows the results using nnUnet and further refinement in performance with the number of interactions using IntSeg architecture.

Ablation Study: To further validate the results, an ablation study was conducted on the heart and spleen dataset. The study defined the performance by carrying out a percentile study of the data distribution. Various performance points are p_max (max performance), p_25 (25th percentile), p_50 (50th percentile), p_75 (75th percentile), and p_min (min performance).

The entire test dataset (population) was divided into four equal splits (sub-population) based on the performance percentile, as [p_min p_75], [p_75 p_50], (p_50 p_25], and (p_25 p_max]. The study then emphasized on the images with inaccurate segmentation which thus indicates the helpfulness of user-annotations in interactive training strategy.

Figure 6A:
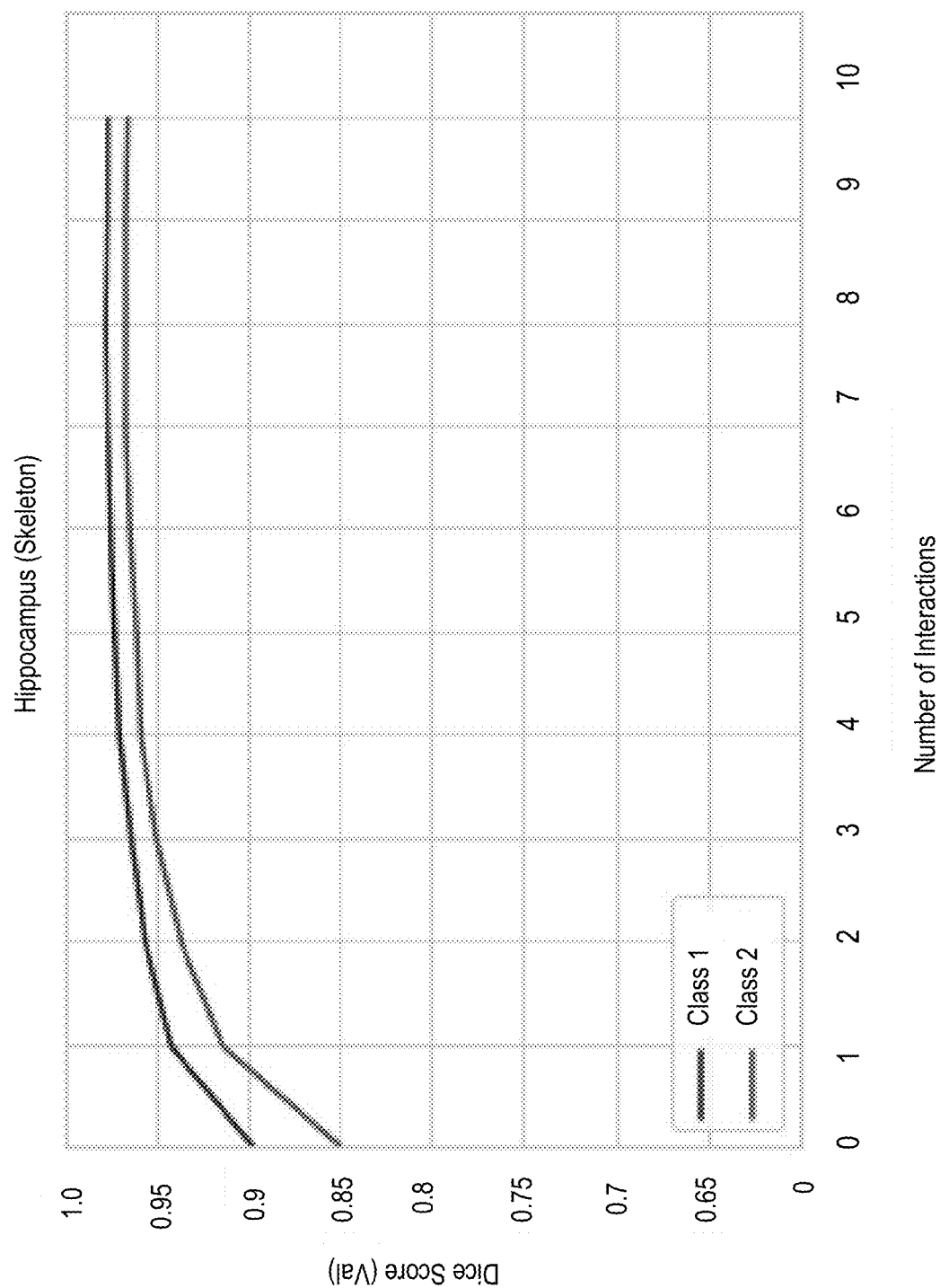
FIGS. 6A and 6B show a mean dice score per interaction is shown on (a) Hippocampus to segment two neighboring small structures i.e., anterior and posterior hippocampus and (b) Pancreas dataset to segment pancreas organ and pancreas cancer using skeleton scribble for 10 interactions, in accordance with described embodiments.
Figure 6B:
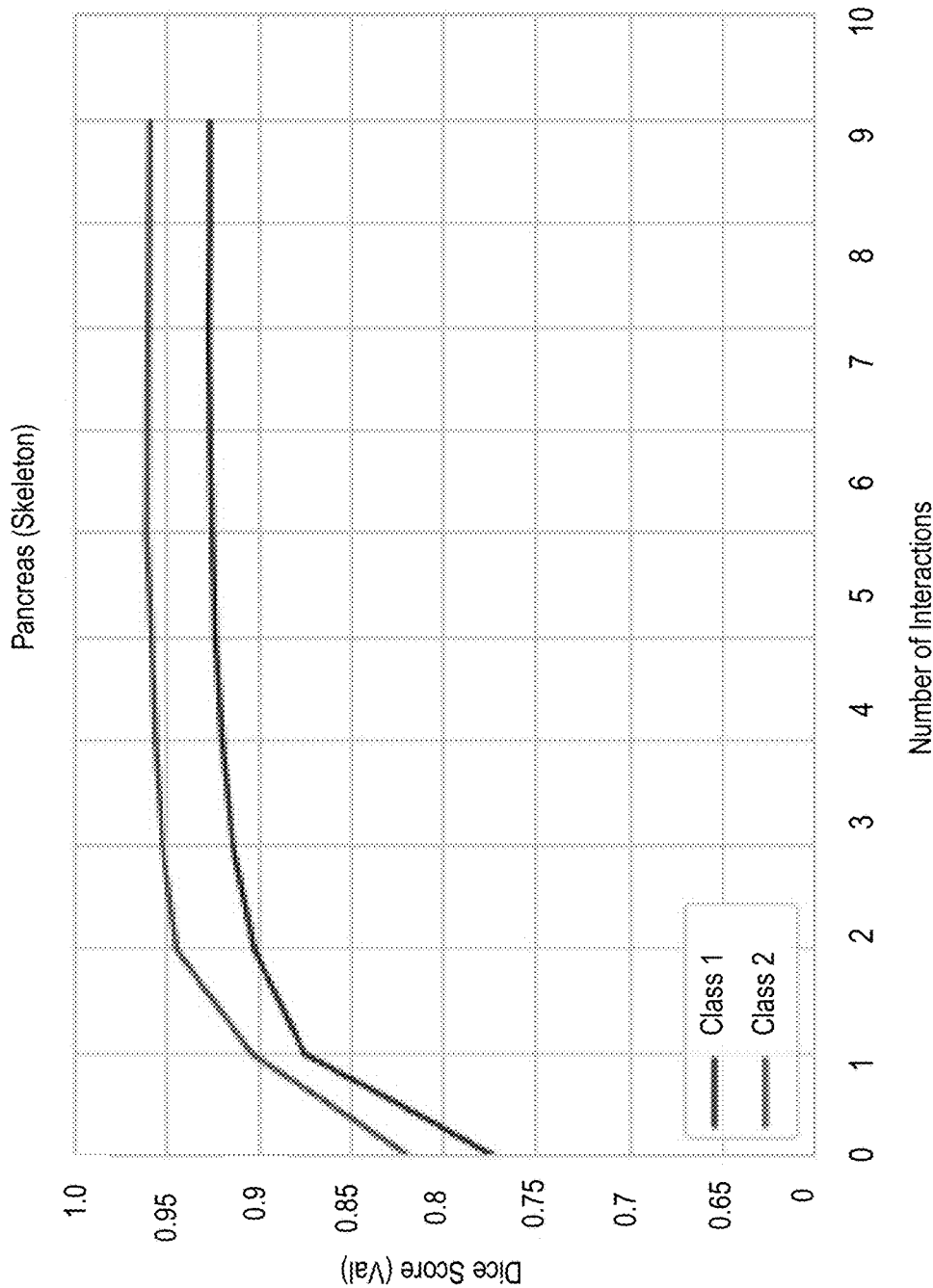

FIGS. 6A and 6B show a mean dice score per interaction is shown on (a) Hippocampus to segment two neighboring small structures i.e., anterior and posterior hippocampus and (b) Pancreas dataset to segment pancreas organ and pancreas cancer using skeleton scribble for 10 interactions, according to described embodiments.

FIG. 6C presents Table 2 at element 699 which illustrates the results of different proposed scribble types within the interaction network on five 3D segmentation tasks across organs, diseases, and modalities for interactions 0 to 4. More particularly, Table 2 summarizes the number of clicks needed for each annotation method (scribble) to reach a certain performance. It can be observed that our skeleton method (curve) outperforms other approaches on all the datasets.

Influence of the Annotation Strategy:

The type of scribble used for correction is important and can influence the performance. Hence, the inventors evaluated performance across different scribble inputs as shown in FIG. 2 on the Prostate dataset from NCI-ISBI 2013 challenge. As shown in FIG. 4B, it is further observed that the best performance is achieved when the largest incorrect cluster is considered a scribble. However, this may be impractical for annotators to mark the complete cluster. Note also that the skeleton approach clearly increases the benefits of the annotations compared to other encoding methodologies; and the mDice score is increased by 10% in just one interaction. Finally, other region based interactions were also been evaluated which rely on clicks; also bringing considerable improvement in performance. Through these experiments, the effectiveness of good specification of user interaction to minimize the number of clicks and maintain high quality segmentation was demonstrated.

Figure 6D:
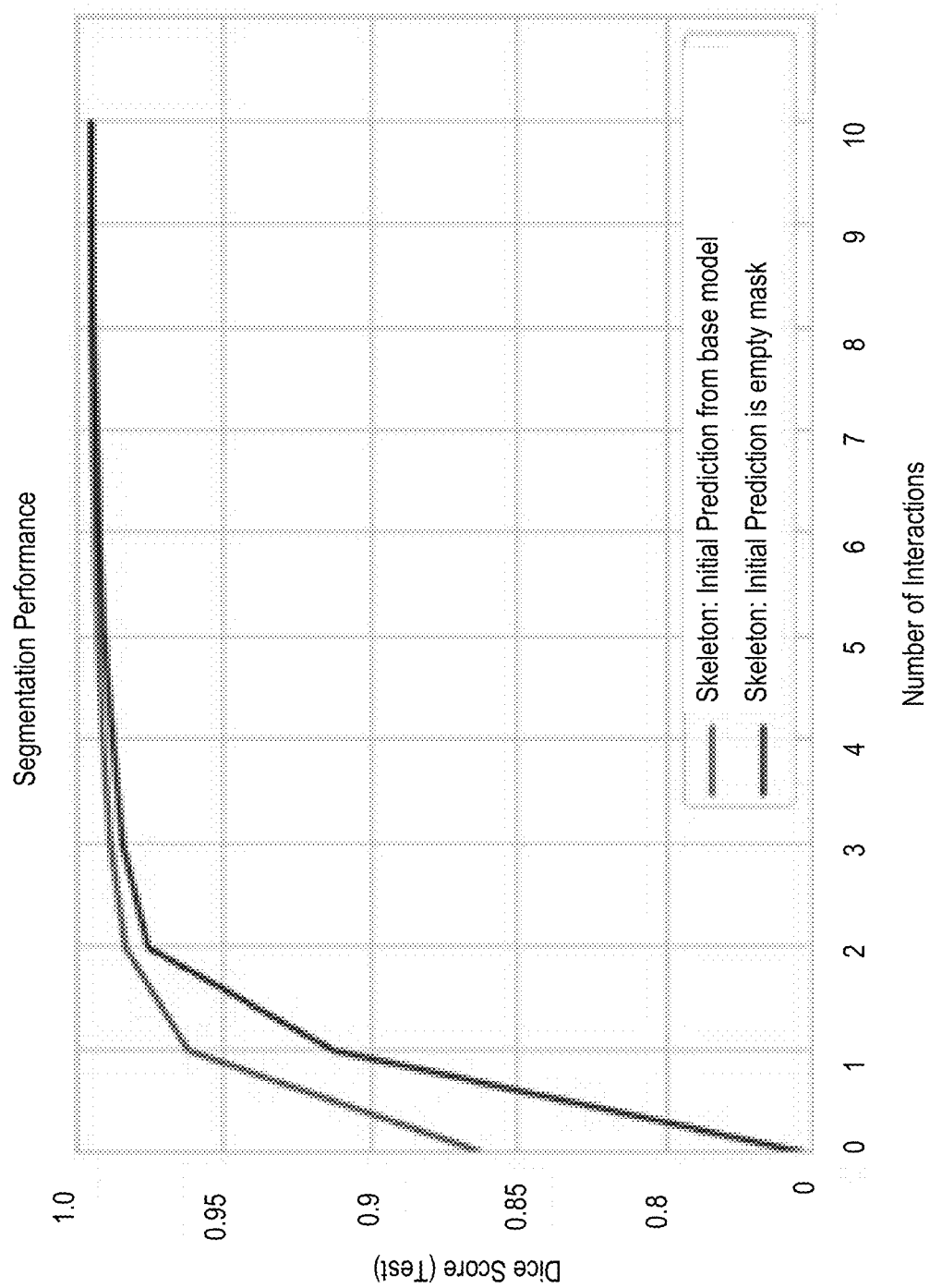
FIG. 6D shows a comparison of using two different initial segmentation mask on the prostate dataset.

FIG. 6D shows a comparison of using two different initial segmentation mask on the prostate dataset.

Figure 6E:
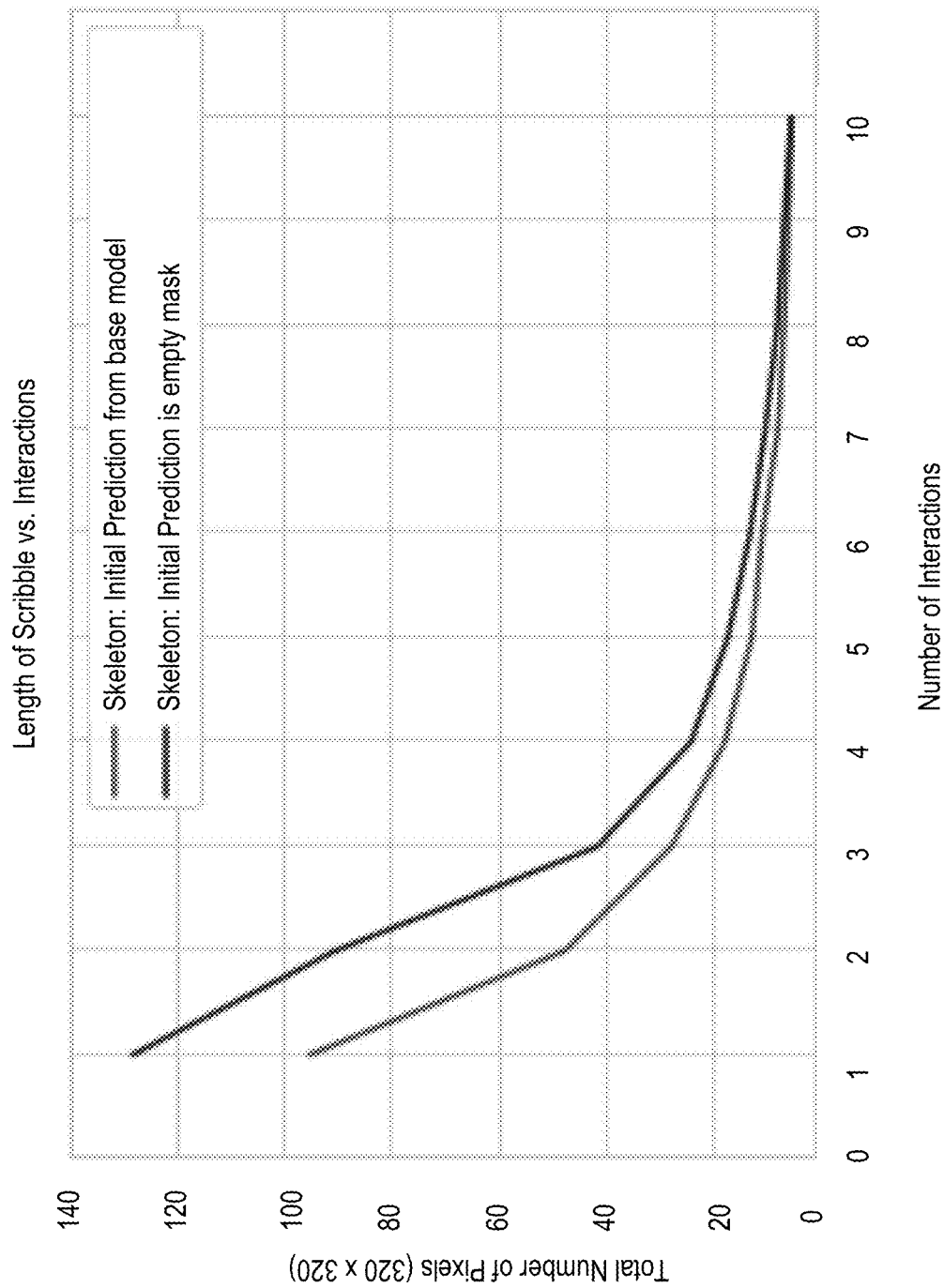
FIG. 6E shows the Influence of the initial segmentation mask on the average curve length per interactions.

FIG. 6E shows the Influence of the initial segmentation mask on the average curve length per interactions.

Influence of the Base Model:

Experiments compared the significance of the base model on the performance. These experiments also allowed for the study of whether or not the initial quality of the segmentation maps influences annotations to refine its prediction. As shown here, an empty mask was used as an initial prediction to train interactive network architecture. It may thus be observed at FIG. 6D that the use of base model clearly improves the segmentation performance. FIG. 6E shows the decrease in average length of scribble for the first 10 interactions. The significant variation in scribble length can be explained by their initial prediction. In the case of using a blank mask, the annotator draws a curve having average length 109 per instance over two rounds of interactive segmentation. In comparison, the described methodology as set forth herein reaches 98% mean Dice score in an average curve length of 70 per instance. Therefore a trade-off is present between annotation effort and quality.

Figure 7A:
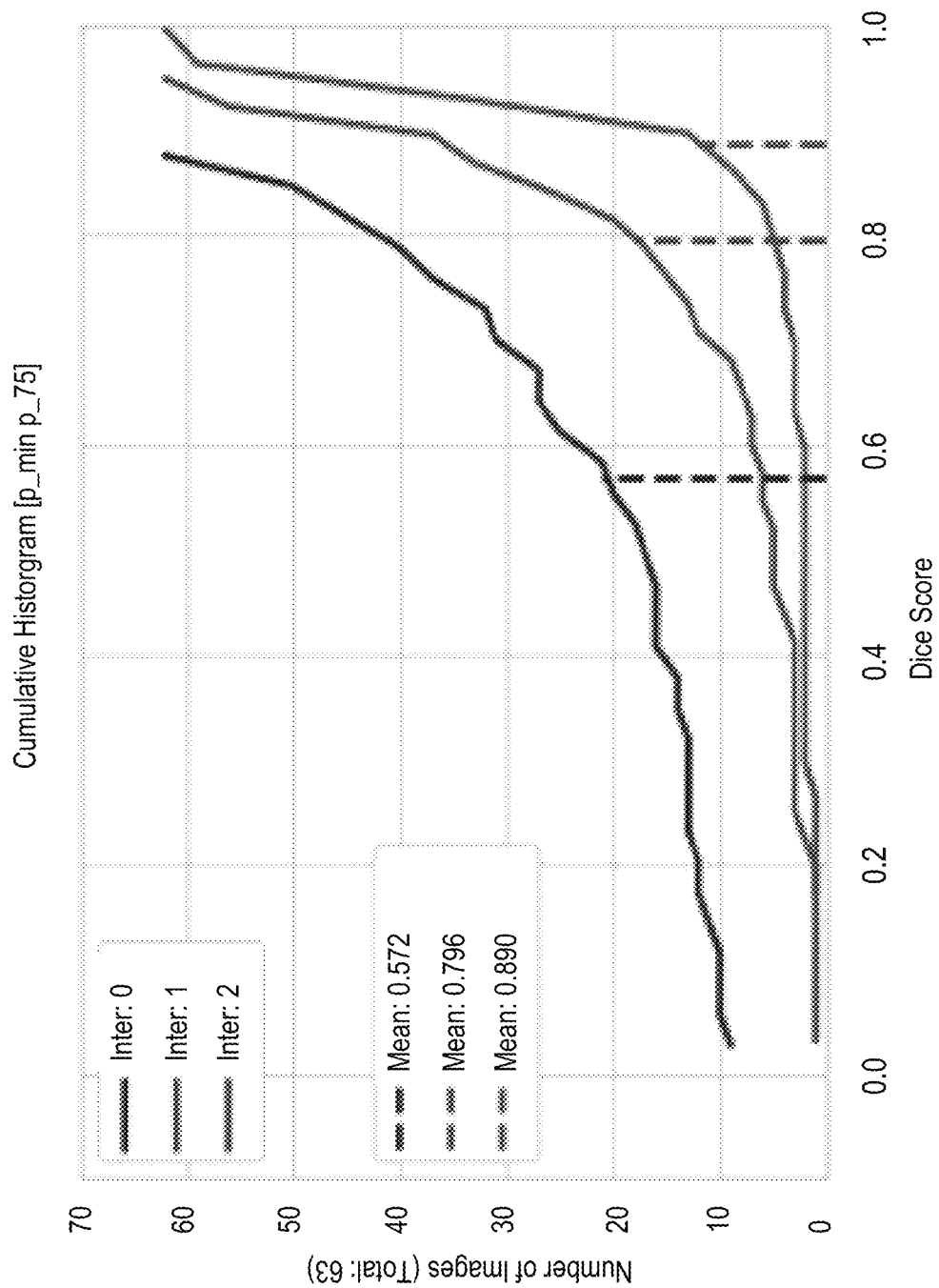
FIGS. 7A and 7B show a cumulative histogram shows the performance improvement for images [p_min p_75] with interactions 0-2 for dataset (a) Heart and (b) Spleen, in accordance with described embodiments.
Figure 7B:
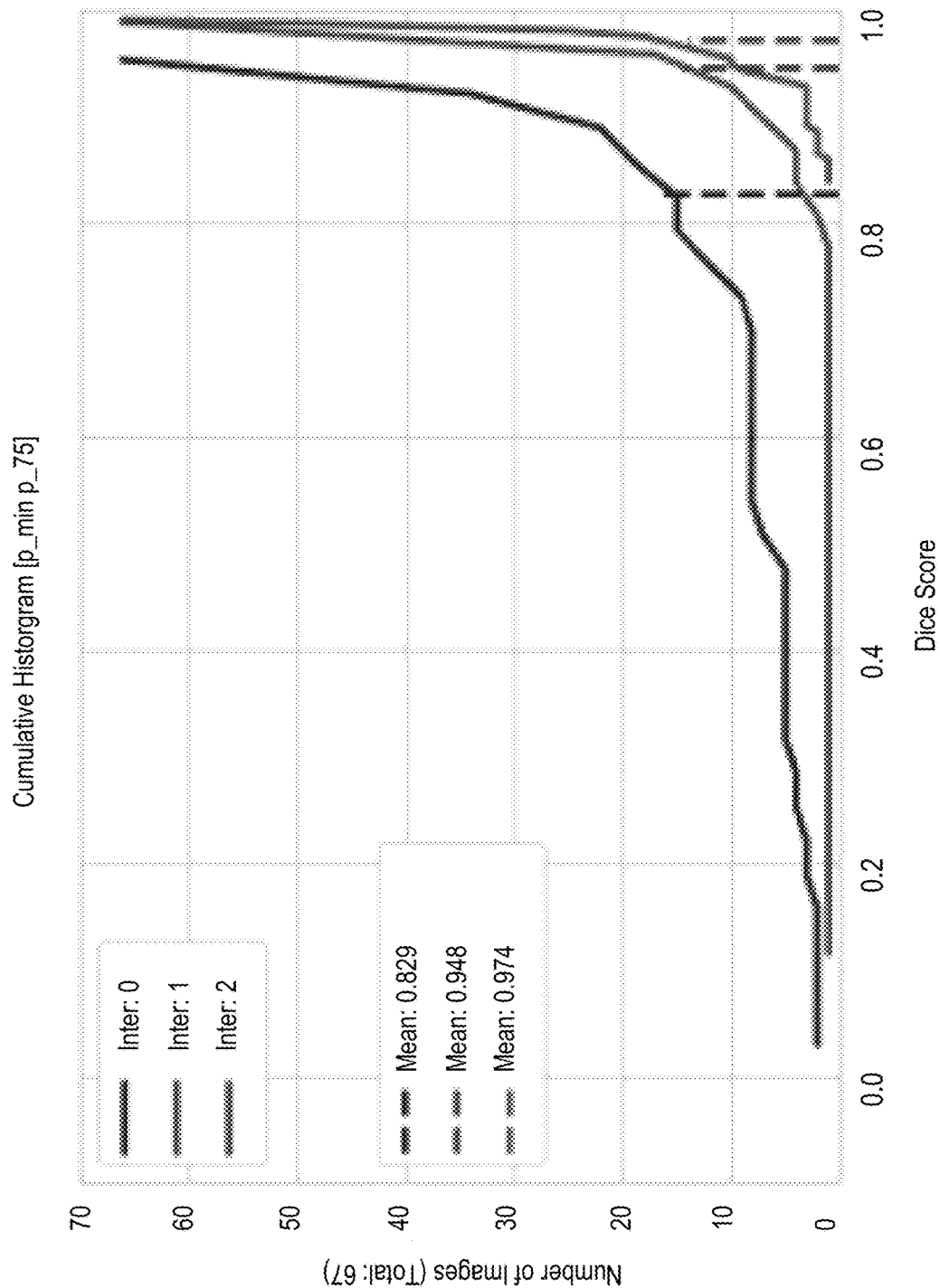

FIGS. 7A and 7B show a cumulative histogram shows the performance improvement for images [p_min p_75] with interactions 0-2 for dataset (a) Heart and (b) Spleen. The mean dice score increased from 0.572 to 0.890 after two (2) interactions for p_25% of images in case of heart segmentation. For spleen, the average performance increase is from 0.829 to 0.974, according to described embodiments.

Figure 8A:
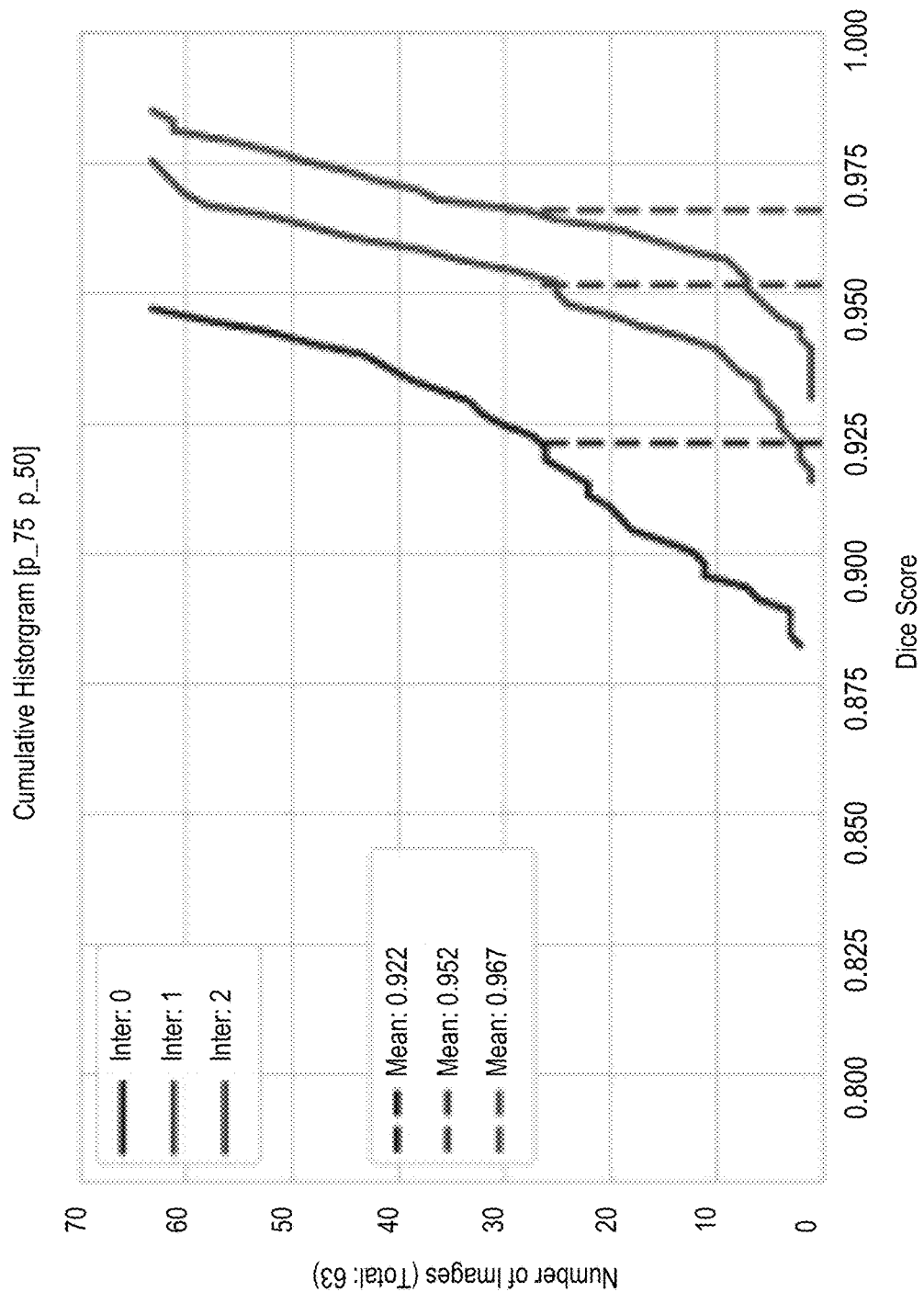
FIGS. 8A and 8B show a cumulative histogram shows the performance improvement for images [p_75 p_50] with interactions 0-2 for dataset (a) Heart and (b) Spleen, in accordance with described embodiments.
Figure 8B:
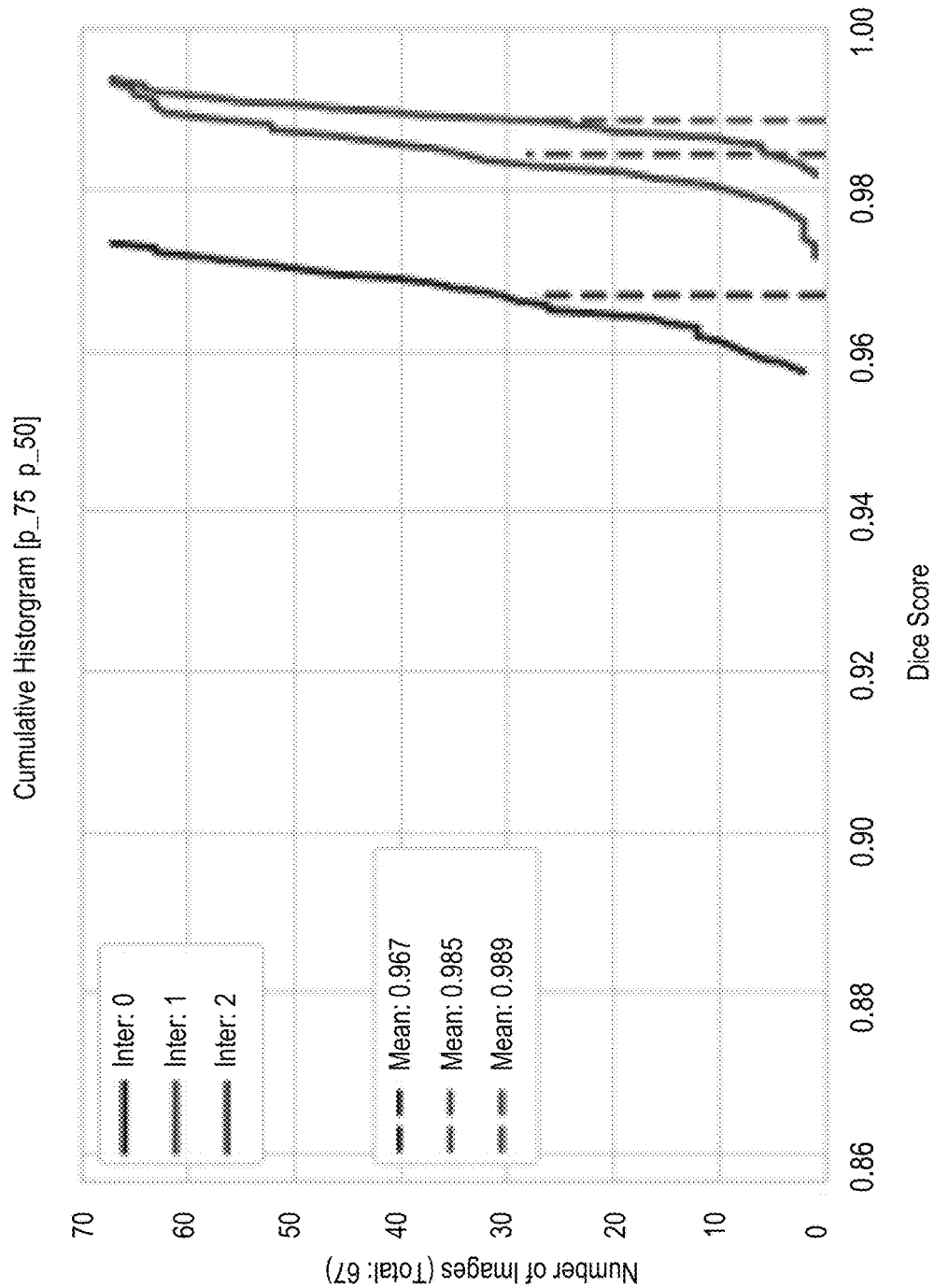

FIGS. 8A and 8B show a cumulative histogram shows the performance improvement for images (p_75 p_50] with interactions 0-2 for dataset (a) Heart and (b) Spleen, according to described embodiments.

Figure 8C:
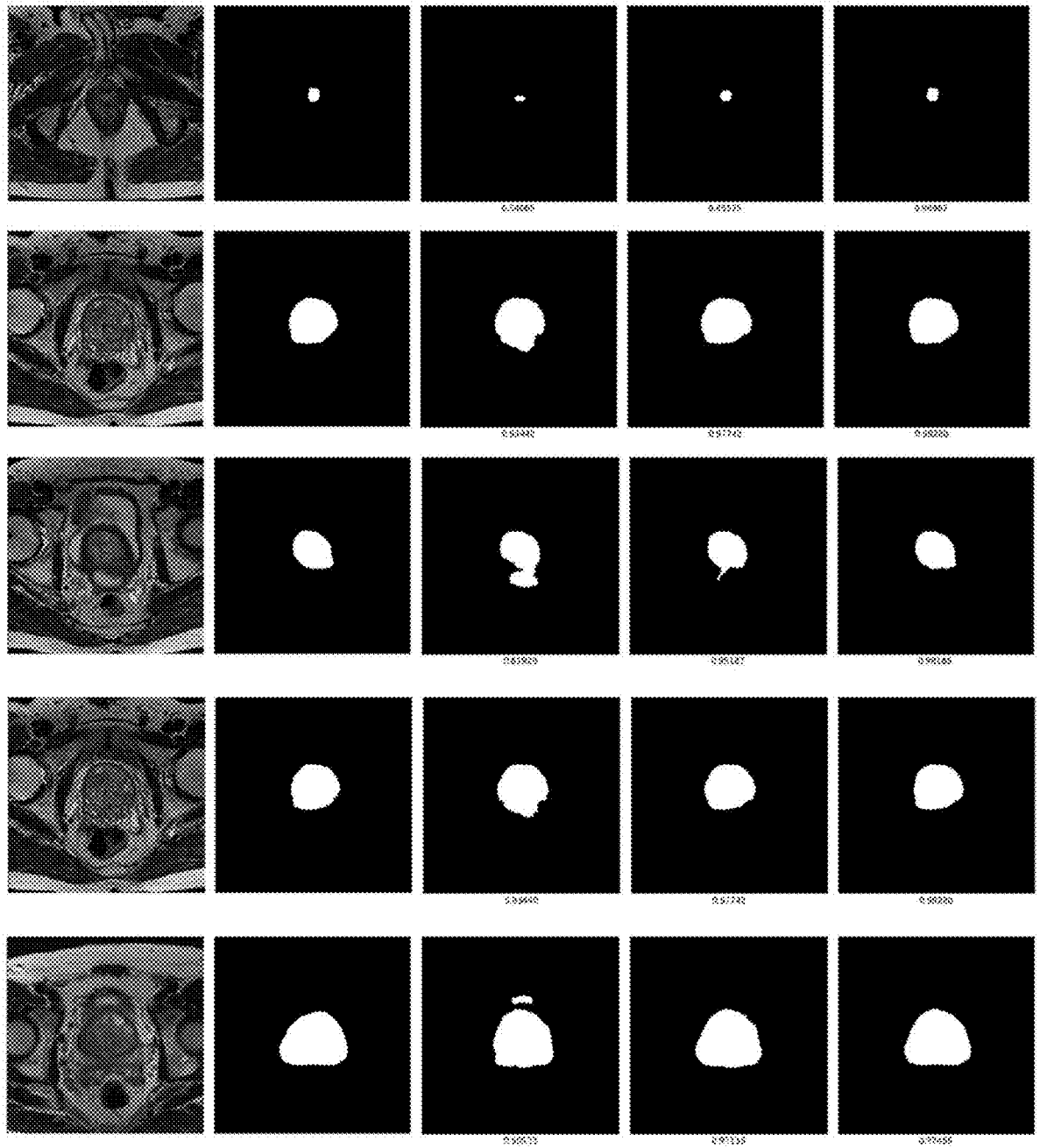
FIG. 8C depicts qualitative results of prostate segmentation, in accordance with described embodiments.

FIG. 8C depicts qualitative results of prostate segmentation. Specifically, binary segmentation is performed by combining the labels of central gland and peripheral zone. Each row shows the input image, ground truth, prediction from base model, prediction at interaction 1 and 2 using skeleton scribble.

Figure 8D:
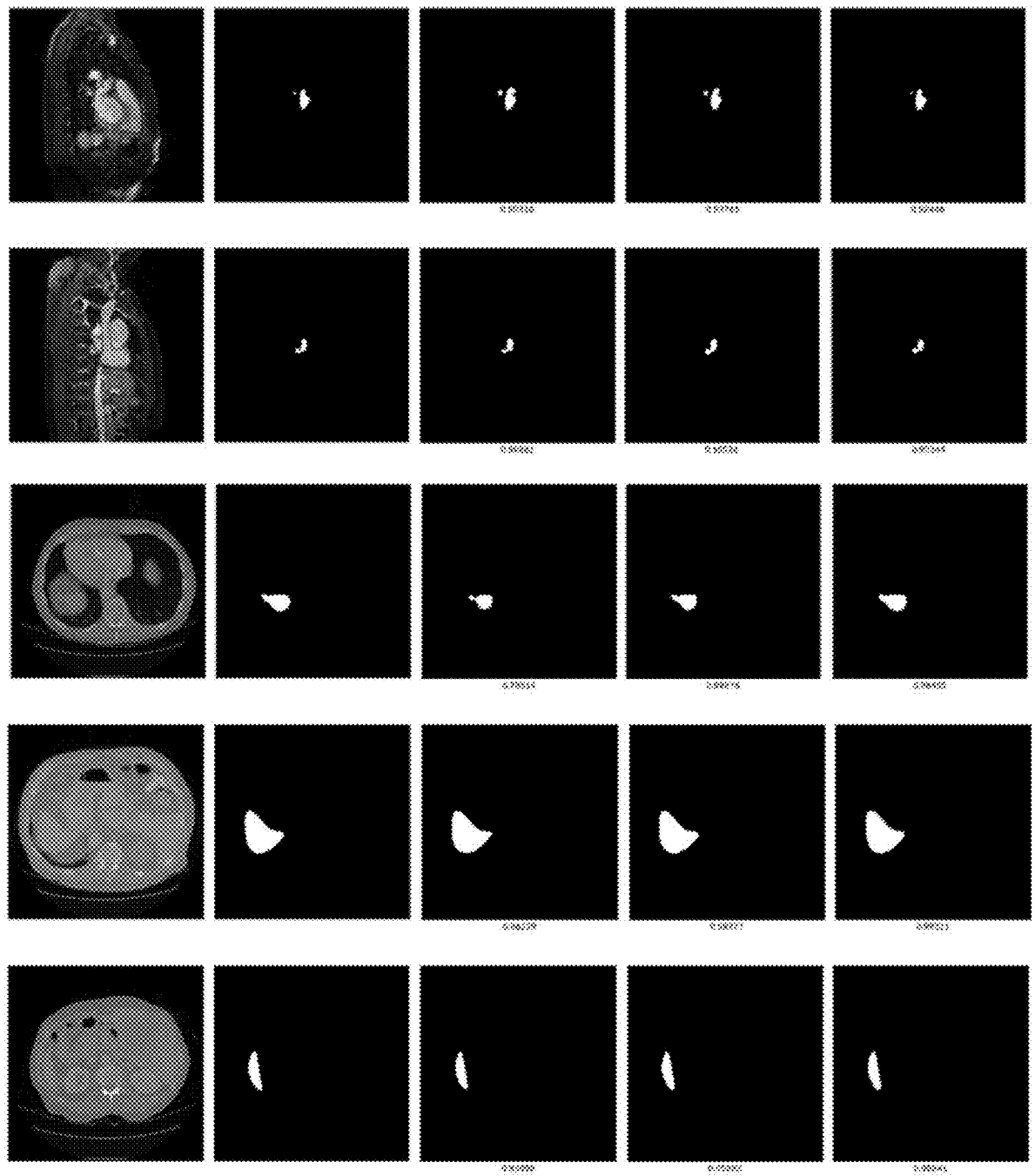
FIG. 8D depicts a visual comparison of two annotation strategies for heart (rows 1 and 2) and spleen (rows 3, 4 and 5) segmentation, in accordance with described embodiments.

FIG. 8D depicts a visual comparison of two annotation strategies for heart (rows 1 and 2) and spleen (rows 3, 4 and 5) segmentation. Each row shows the input image, ground truth, prediction from base model, prediction at interaction 2 using region scribble and skeleton scribble respectively. It may thus be observed that skeleton scribble achieves a larger improvement of accuracy from the initial segmentation when compared with the use of region scribble.

CONCLUSION

A semi-automatic training strategy is therefore presented in accordance with the described methodologies which utilizes user input data capture from (or sometimes generated to simulate) user-scribbles, user-clicks, and user mouse-movements via which to guide the neural network to correct image segmentation error. In accordance with certain embodiments, the user-model emulates an actual annotator and generates scribbles for training the interaction network. The model continuously improves with each interaction from new information provided by the user scribble and updated prediction. Various user interactions were evaluated and it was observed that the skeleton based interactive input performs better than other heuristic methods like region based, largest connected component based scribble. It was further observed that use of the skeleton based interactive input yields the maximum performance boost in just two to three user-inputs. Finally, using interactive network on top of the state-of-the-art segmentation architecture, improves the prediction accuracy further, compared to when the base model is a simple encoder decoder architecture.

FIG. 9 depicts a flow diagram illustrating a method 900 for implementing medical image segmentation using interactive refinement, in accordance with disclosed embodiments. Method 900 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 701 (see FIG. 7) and the machine 801 (see FIG. 8) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 900 depicted at FIG. 9, there is a method performed by a system specially configured for the performing medical image segmentation using interactive refinement, in which the trained semantic genesis models are then utilized for the processing of medical imaging. Such a system may be configured with at least a processor and a memory to execute specialized instructions which cause the system to perform the following operations:

At block 905, processing logic operates a two-step learning operation via a deep learning training framework having both a base segmentation model and an interCNN model, by performing the operations that follow.

At block 910, processing logic receives original input images at the deep learning training framework.

At block 915, processing logic generates an initial prediction image specifying image segmentation by processing the original input images through the base segmentation model to render the initial prediction image in the absence of user input guidance signals.

At block 920, processing logic receives user input guidance signals indicating user-guided segmentation refinements to the initial prediction image.

At block 925, processing logic routes each of (i) the original input images, (ii) the initial prediction image, and (iii) the user input guidance signals to an InterCNN.

At block 930, processing logic generates a refined prediction image specifying refined image segmentation by processing each of the (i) the original input images, (ii) the initial prediction image, and (iii) the user input guidance signals through the InterCNN to render the refined prediction image incorporating the user input guidance signals.

At block 935, processing logic outputs a refined segmentation mask based on application of the user input guidance signals to the deep learning training framework as a guidance signal.

According to another embodiment, method 900 further includes: iteratively repeating each of the following operations for two or more cycles: receiving new user input guidance signals indicating user-guided segmentation refinements to the refined prediction image specifying the refined image segmentation, routing each of (i) the original input images, (ii) the refined prediction image, and (iii) the new user input guidance signals to the InterCNN, and generating a new refined prediction image specifying newly refined image segmentation by processing each of the (i) the original input images, (ii) the refined prediction image, and (iii) the new user input guidance signals through the Inter-CNN to render the new refined prediction image incorporating the new user input guidance signals; and subsequent to completing the two or more cycles, outputting the refined segmentation mask based on application of multiple iterations of the user input guidance signals to the deep learning training framework as the guidance signal.

According to another embodiment of method 900, receiving the user input guidance signals includes: generating synthesized user guidance input for use as the user input guidance signals by the deep learning training framework during training; and in which receiving the user input guidance signals includes routing the synthesized user guidance input previously generated into the two-step learning operation performed via the deep learning training framework.

According to another embodiment, method 900 further includes: displaying the initial prediction image to a user interface; receiving the user input guidance signals at the user interface indicating user-guided segmentation refinements to the initial prediction image displayed; and in which receiving the user input guidance signals includes routing the user input guidance signals received at the user interface into the two-step learning operation performed via the deep learning training framework.

According to another embodiment of method 900, the user input guidance signals include generated user input in the form of scribbles applied to the initial segmentation mask outputted as an initial prediction image during training.

According to another embodiment of method 900, the user input guidance signals include generated user input representing corrections to the initial segmentation mask outputted as the initial prediction image during training.

According to another embodiment of method 900, the user input guidance signals include generated user input simulating scribbles by a user annotating the initial segmentation mask outputted as an initial prediction image during training.

According to another embodiment of method 900, a U-Net based neural network architecture is utilized to predict an initial segmentation mask; and in which a 3D nn-UNet is further utilized as a robust and self-adapting framework with the ability to dynamically adapt to the details of the datasets.

According to another embodiment of method 900, the self-adapting framework with the ability to dynamically adapt to the details of the datasets is based upon one or more of: a median patient size; an input patch size sampled from the original input images; a batch size corresponding to receipt of a plurality of original input images provided as input during the training; and an amount of available GPU memory.

According to another embodiment of method 900, the user input guidance signals includes synthesized user guidance inputs received via the deep learning training framework, each of the synthesized user guidance inputs selected from the group including: synthesized user mouse events; synthesized user clicks; synthesized user click and drag input operations; synthesized user mouse over events; synthesized user mouse release events; and in which the synthesized user guidance input operate as a guidance signal to the deep learning training framework.

According to another embodiment of method 900, the user guidance input comprises a plurality of interactions, each characterized as one of: (i) "Foreground Clicks" identified as c+ which are placed within an area of interest to guide the interaction network toward predicting a foreground; (ii) "Background Clicks" identified as c_ which are placed into false positive areas that were incorrectly segmented as foreground regions during the training which resulted in the outputting of the initial segmentation mask outputted as the initial prediction; and wherein the interactions are communicated to an interactive segmentation network (IntSeg) in the form of scribbles having a spatial size which is the same as the original image received as an input image.

According to a particular embodiment, there is a non-transitory computer readable storage media, having instructions stored thereupon, that when executed by a system having a memory to store the instructions and a processor to execute the instructions stored in the memory, the instructions cause the system to perform operations including: operating a two-step learning operation via a deep learning training framework having both a base segmentation model and an interCNN model, by performing the following learning operations: receiving original input images at the deep learning training framework; generating an initial prediction image specifying image segmentation by processing the original input images through the base segmentation model to render the initial prediction image in the absence of user input guidance signals; receiving user input guidance signals indicating user-guided segmentation refinements to the initial prediction image; routing each of (i) the original input images, (ii) the initial prediction image, and (iii) the user input guidance signals to an InterCNN; generating a refined prediction image specifying refined image segmentation by processing each of the (i) the original input images, (ii) the initial prediction image, and (iii) the user input guidance signals through the InterCNN to render the refined prediction image incorporating the user input guidance signals; and outputting a refined segmentation mask based on application of the user input guidance signals to the deep learning training framework as a guidance signal.

Figure 10:
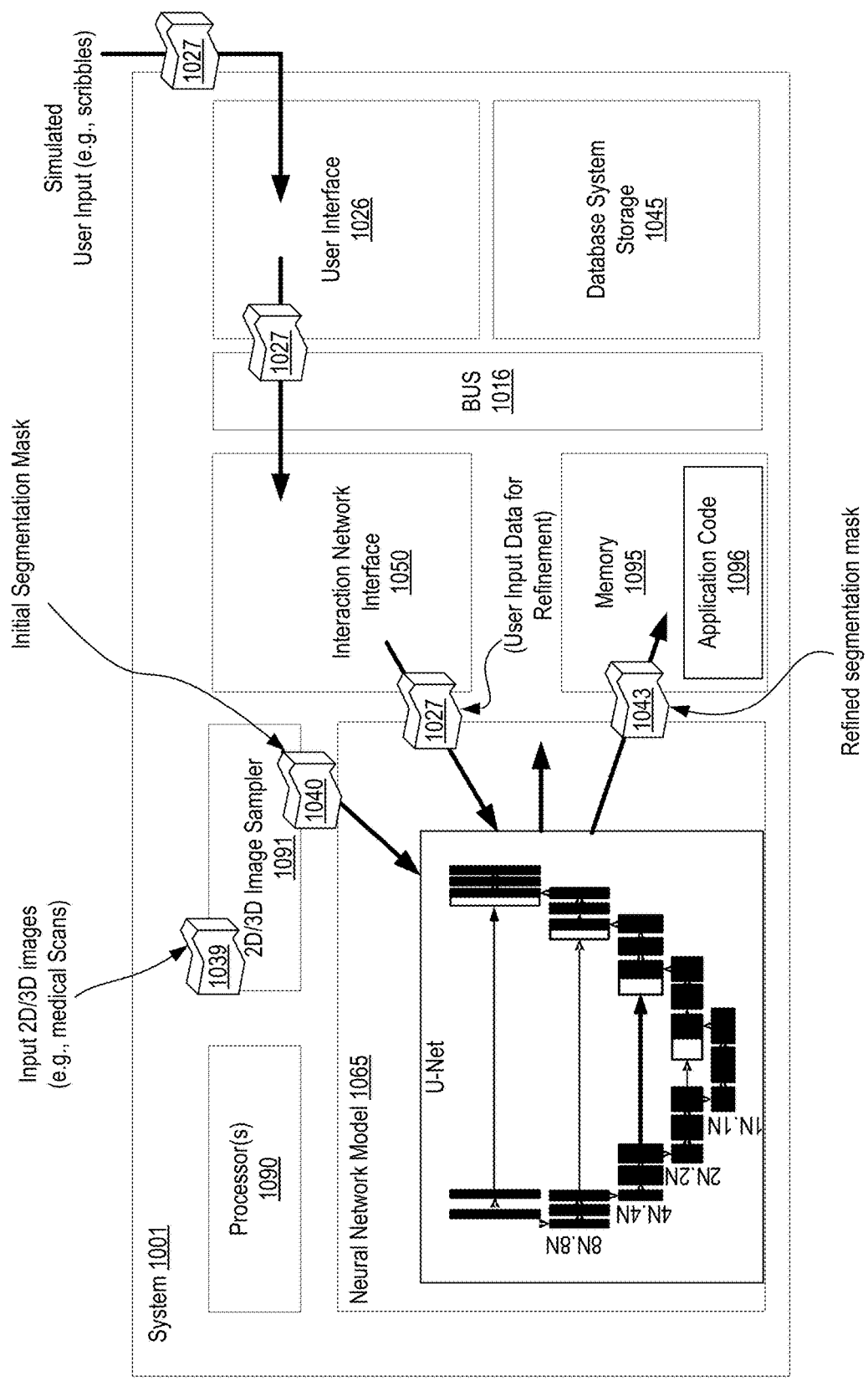
FIG. 10 shows a diagrammatic representation of a system 1001 within which embodiments may operate, be installed, integrated, or configured, in accordance with described embodiments.

FIG. 10 shows a diagrammatic representation of a system 1001 within which embodiments may operate, be installed, integrated, or configured. In accordance with one embodiment, there is a system 1001 having at least a processor 1090 and a memory 1095 therein to execute implementing application code 1096. Such a system 1001 may communicatively interface with and cooperatively execute with the benefit of remote systems, such as a user device sending instructions and data, a user device to receive as an output from the system 1001 a semantics-enriched pre-trained model having a trained encoder-decoder structure with skip connections in between based on the performance of the self-discovery operation, a self-classification operation, and a self-restoration operation as performed by the system 1001, or systems within a networked or within a client-server environment, etc.

According to the depicted embodiment, the system 1001, includes the processor 1090 and the memory 1095 to execute instructions at the system 1001. The system 1001 as depicted here is specifically customized and configured to perform medical image segmentation using interactive refinement, in which trained models are then utilized for the processing of medical imaging.

According to a particular embodiment, system 1001 is further configured to execute instructions via the processor for operating a two-step learning operation via a deep learning training framework having both a base segmentation model and an interCNN model, by performing the following learning operations: receiving original input images at the deep learning training framework (e.g., via interaction network interface 1050); generating an initial prediction image 1027 specifying image segmentation by processing the original input images (e.g., input 2D/3D images or medical scans 1039) through the base segmentation model to render the initial prediction image (e.g., an initial segmentation mask 1040) in the absence of user input guidance signals; receiving user input guidance signals 1027 indicating user-guided segmentation refinements to the initial prediction image; routing each of (i) the original input images, (ii) the initial prediction image, and (iii) the user input guidance signals to an InterCNN; generating a refined prediction image (e.g., a refined segmentation mask 1043) specifying refined image segmentation by processing each of the (i) the original input images, (ii) the initial prediction image, and (iii) the user input guidance signals through the InterCNN to render the refined prediction image incorporating the user input guidance signals; and outputting a refined segmentation mask based on application of the user input guidance signals to the deep learning training framework as a guidance signal.

The model output manager 1085 may further transmit output back to a user device or other requestor, for example, via the user interface 1026, or such information may alternatively be stored within the database system storage 1045 of the system 1001.

According to another embodiment of the system 1001, a user interface 1026 communicably interfaces with a user client device remote from the system and communicatively interfaces with the system via a public Internet. As shown here, the user interface is further configured to receive the simulated user input 1027, such as scribbles, user corrections, user mouse inputs, user clicks, and so forth.

Bus 1016 interfaces the various components of the system 1001 amongst each other, with any other peripheral(s) of the system 1001, and with external components such as external network elements, other machines, client devices, cloud computing services, etc. Communications may further include communicating with external devices via a network interface over a LAN, WAN, or the public Internet.

FIG. 11 illustrates a diagrammatic representation of a machine 1101 in the exemplary form of a computer system, in accordance with one embodiment, within which a set of instructions, for causing the machine/computer system 1101 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1101 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1118 (e.g., a persistent storage device including hard disk drives and a persistent database and/or a multi-tenant database implementation), which communicate with each other via a bus 1130. Main memory 1104 includes a base segmentation network 1124 via which to receive original input images and perform an initial prediction (without user input guidance signals). Main memory further includes the Interactive CNN or "InterCNN" 1125 via which to then refine the initial prediction by taking user input guidance signals as well as the initial prediction and the original input images via which to then generate an improved and refined image segmentation and prediction model for use with processing medical imaging in support of the methodologies and techniques described herein. Main memory further includes a set of original input images 1123. Main memory 1104 and its sub-elements are further operable in conjunction with processing logic 1126 and processor 1102 to perform the methodologies discussed herein.

Processor 1102 represents one or more specialized and specifically configured processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application-specific integrated circuit (ASIC), a field programmable gate array (FPGA), a digital signal processor (DSP), network processor, or the like. Processor 1102 is configured to execute the processing logic 1126 for performing the operations and functionality which is discussed herein.

The computer system 1101 may further include a network interface card 1108. The computer system 1101 also may include a user interface 1110 (such as a video display unit, a liquid crystal display, etc.), an alphanumeric input device 1112 (e.g., a keyboard), a cursor control device 1113 (e.g., a mouse), and a signal generation device 1116 (e.g., an integrated speaker). The computer system 1101 may further include peripheral device 1136 (e.g., wireless or wired communication devices, memory devices, storage devices, audio processing devices, video processing devices, etc.).

The secondary memory 1118 may include a non-transitory machine-readable storage medium or a non-transitory computer readable storage medium or a non-transitory machine-accessible storage medium 1131 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1101, the main memory 1104 and the processor 1102 also constituting machine-readable storage media. The software 1122 may further be transmitted or received over a network 1120 via the network interface card 1108.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
    a memory to store instructions;
    a processor to execute the instructions stored in the memory;
    wherein the system is specially configured to:
    execute instructions via the processor for operating a two-step learning operation via a deep learning training framework having both a base segmentation model and an interCNN model, by performing the following learning operations:
    receiving original input images at the deep learning training framework;
    generating an initial prediction image specifying image segmentation by processing the original input images through the base segmentation model to render the initial prediction image in the absence of user input guidance signals;
    receiving user input guidance signals indicating user-guided segmentation refinements to the initial prediction image;
    routing each of (i) the original input images, (ii) the initial prediction image, and (iii) the user input guidance signals to an InterCNN;
    generating a refined prediction image specifying refined image segmentation by processing each of the (i) the original input images, (ii) the initial prediction image, and (iii) the user input guidance signals through the InterCNN to render the refined prediction image incorporating the user input guidance signals; and
    outputting a refined segmentation mask based on application of the user input guidance signals to the deep learning training framework as a guidance signal.

2. The system of claim 1, wherein the system is further configured to execute the following operations:
    iteratively repeating each of the following operations for two or more cycles:
        receiving new user input guidance signals indicating user-guided segmentation refinements to the refined prediction image specifying the refined image segmentation,
        routing each of (i) the original input images, (ii) the refined prediction image, and (iii) the new user input guidance signals to the InterCNN, and
        generating a new refined prediction image specifying newly refined image segmentation by processing each of the (i) the original input images, (ii) the refined prediction image, and (iii) the new user input guidance signals through the InterCNN to render the new refined prediction image incorporating the new user input guidance signals; and
    subsequent to completing the two or more cycles, outputting the refined segmentation mask based on application of multiple iterations of the user input guidance signals to the deep learning training framework as the guidance signal.

3. The system of claim 1, wherein receiving the user input guidance signals comprises:
    generating synthesized user guidance input for use as the user input guidance signals by the deep learning training framework during training; and
    wherein receiving the user input guidance signals comprises routing the synthesized user guidance input previously generated into the two-step learning operation performed via the deep learning training framework.

4. The system of claim 1, wherein the user input guidance signals comprise one or more of:
    (i) generated user input in the form of scribbles applied to the initial segmentation mask outputted as an initial prediction image during training;
    (ii) generated user input representing corrections to the initial segmentation mask outputted as the initial prediction image during training; and
    (iii) generated user input simulating scribbles by a user annotating the initial segmentation mask outputted as an initial prediction image during training.

5. The system of claim 1:
    wherein a U-Net based neural network architecture is utilized to predict an initial segmentation mask;
    wherein a 3D nn-UNet is further utilized as a robust and self-adapting framework with the ability to dynamically adapt to the details of the datasets; and
    wherein the self-adapting framework with the ability to dynamically adapt to the details of the datasets is based upon one or more of:
    a median patient size;
    an input patch size sampled from the original image;
    a batch size corresponding to receipt of a plurality of original images provided as input during the training; and
    an amount of available GPU memory.

6. The system of claim 1, wherein the synthesized user guidance input received via the interaction network comprises one or more of:
    synthesized user mouse events;
    synthesized user clicks;
    synthesized user click and drag input operations;
    synthesized user mouse over events;
    synthesized user mouse release events;
    wherein the synthesized user guidance input operate as a guidance signal to the interaction network;
    wherein the user guidance input signals comprises a plurality of interactions, each characterized as one of:
    (i) "Foreground Clicks" identified as $c_+$ which are placed within an area of interest to guide the interaction network toward predicting a foreground;
    (ii) "Background Clicks" identified as $c_-$ which are placed into false positive areas that were incorrectly segmented as foreground regions during the training which resulted in the outputting of the initial segmentation mask outputted as the initial prediction; and
    wherein the interactions are communicated to an interactive segmentation network (IntSeg) in the form of scribbles having a spatial size which is the same as the original image received as an input image.

7. A method performed by a system having at least a processor and a memory therein to execute instructions, wherein the method comprises:
operating a two-step learning operation via a deep learning training framework having both a base segmentation model and an interCNN model, by performing the following learning operations:
receiving original input images at the deep learning training framework;
generating an initial prediction image specifying image segmentation by processing the original input images through the base segmentation model to render the initial prediction image in the absence of user input guidance signals;
receiving user input guidance signals indicating user-guided segmentation refinements to the initial prediction image;
routing each of (i) the original input images, (ii) the initial prediction image, and (iii) the user input guidance signals to an InterCNN;
generating a refined prediction image specifying refined image segmentation by processing each of the (i) the original input images, (ii) the initial prediction image, and (iii) the user input guidance signals through the InterCNN to render the refined prediction image incorporating the user input guidance signals; and
outputting a refined segmentation mask based on application of the user input guidance signals to the deep learning training framework as a guidance signal.

8. The method of claim 7, further comprising:
iteratively repeating each of the following operations for two or more cycles:
receiving new user input guidance signals indicating user-guided segmentation refinements to the refined prediction image specifying the refined image segmentation,
routing each of (i) the original input images, (ii) the refined prediction image, and (iii) the new user input guidance signals to the InterCNN, and
generating a new refined prediction image specifying newly refined image segmentation by processing each of the (i) the original input images, (ii) the refined prediction image, and (iii) the new user input guidance signals through the InterCNN to render the new refined prediction image incorporating the new user input guidance signals; and
subsequent to completing the two or more cycles, outputting the refined segmentation mask based on application of multiple iterations of the user input guidance signals to the deep learning training framework as the guidance signal.

9. The method of claim 7, wherein receiving the user input guidance signals comprises:
generating synthesized user guidance input for use as the user input guidance signals by the deep learning training framework during training; and
wherein receiving the user input guidance signals comprises routing the synthesized user guidance input previously generated into the two-step learning operation performed via the deep learning training framework.

10. The method of claim 7, further comprising:
displaying the initial prediction image to a user interface;
receiving the user input guidance signals at the user interface indicating user-guided segmentation refinements to the initial prediction image displayed; and
wherein receiving the user input guidance signals comprises routing the user input guidance signals received at the user interface into the two-step learning operation performed via the deep learning training framework.

11. The method of claim 7, wherein the user input guidance signals comprise generated user input in the form of scribbles applied to the initial segmentation mask outputted as an initial prediction image during training.

12. The method of claim 7, wherein the user input guidance signals comprise generated user input representing corrections to the initial segmentation mask outputted as the initial prediction image during training.

13. The method of claim 7, wherein the user input guidance signals comprise generated user input simulating scribbles by a user annotating the initial segmentation mask outputted as an initial prediction image during training.

14. The method of claim 7:
wherein a U-Net based neural network architecture is utilized to predict an initial segmentation mask; and
wherein a 3D nn-UNet is further utilized as a robust and self-adapting framework with the ability to dynamically adapt to the details of the datasets.

15. The method of claim 14, wherein the self-adapting framework with the ability to dynamically adapt to the details of the datasets is based upon one or more of:
a median patient size;
an input patch size sampled from the original input images;
a batch size corresponding to receipt of a plurality of original input images provided as input during the training; and
an amount of available GPU memory.

16. The method of claim 7:
wherein the user input guidance signals comprises synthesized user guidance inputs received via the deep learning training framework, each of the synthesized user guidance inputs selected from the group comprising:
synthesized user mouse events;
synthesized user clicks;
synthesized user click and drag input operations;
synthesized user mouse over events;
synthesized user mouse release events; and
wherein the synthesized user guidance input operate as a guidance signal to the deep learning training framework.

17. The method of claim 7, wherein the user guidance input signals comprise a plurality of interactions, each characterized as one of:
(i) "Foreground Clicks" identified as $c_+$ which are placed within an area of interest to guide the interaction network toward predicting a foreground;
(ii) "Background Clicks" identified as $c_-$ which are placed into false positive areas that were incorrectly segmented as foreground regions during the training which resulted in the outputting of the initial segmentation mask outputted as the initial prediction; and
wherein the interactions are communicated to an interactive segmentation network (IntSeg) in the form of scribbles having a spatial size which is the same as the original image received as an input image.

18. Non-transitory computer readable storage media, having instructions stored thereupon, that when executed by a system having a memory to store the instructions and a processor to execute the instructions stored in the memory, the instructions cause the system to perform operations including:

operating a two-step learning operation via a deep learning training framework having both a base segmentation model and an interCNN model, by performing the following learning operations:

receiving original input images at the deep learning training framework;

generating an initial prediction image specifying image segmentation by processing the original input images through the base segmentation model to render the initial prediction image in the absence of user input guidance signals;

receiving user input guidance signals indicating user-guided segmentation refinements to the initial prediction image;

routing each of (i) the original input images, (ii) the initial prediction image, and (iii) the user input guidance signals to an InterCNN;

generating a refined prediction image specifying refined image segmentation by processing each of the (i) the original input images, (ii) the initial prediction image, and (iii) the user input guidance signals through the InterCNN to render the refined prediction image incorporating the user input guidance signals; and outputting a refined segmentation mask based on application of the user input guidance signals to the deep learning training framework as a guidance signal.

19. The non-transitory computer readable storage media of claim 18, wherein the instructions cause the system to perform operations further comprising:

iteratively repeating each of the following operations for two or more cycles:

receiving new user input guidance signals indicating user-guided segmentation refinements to the refined prediction image specifying the refined image segmentation, routing each of (i) the original input images, (ii) the refined prediction image, and (iii) the new user input guidance signals to the InterCNN, and generating a new refined prediction image specifying newly refined image segmentation by processing each of the (i) the original input images, (ii) the refined prediction image, and (iii) the new user input guidance signals through the InterCNN to render the new refined prediction image incorporating the new user input guidance signals; and subsequent to completing the two or more cycles, outputting the refined segmentation mask based on application of multiple iterations of the user input guidance signals to the deep learning training framework as the guidance signal.

20. The non-transitory computer readable storage media of claim 18, wherein the user input guidance signals comprise one or more of:

(i) generated user input in the form of scribbles applied to the initial segmentation mask outputted as an initial prediction image during training;

(ii) generated user input representing corrections to the initial segmentation mask outputted as the initial prediction image during training; and (iii) generated user input simulating scribbles by a user annotating the initial segmentation mask outputted as an initial prediction image during training.

* * * * *